(12) United States Patent
Doleac et al.

(10) Patent No.: US 7,464,120 B1
(45) Date of Patent: *Dec. 9, 2008

(54) METHOD FOR ANALYZING THE QUALITY OF TELECOMMUNICATIONS SWITCH COMMAND TABLES

(75) Inventors: John S. Doleac, Boxborough, MA (US); William T. Freebersyser, Wayland, MA (US); Carolyn M. Jack, Natick, MA (US)

(73) Assignee: Verizon Laboratories Inc., Waltham, MA (US)

( * ) Notice: Subject to any disclaimer, the term of this patent is extended or adjusted under 35 U.S.C. 154(b) by 699 days.

This patent is subject to a terminal disclaimer.

(21) Appl. No.: 10/600,115

(22) Filed: Jun. 20, 2003

Related U.S. Application Data

(63) Continuation of application No. 09/400,050, filed on Sep. 21, 1999, now Pat. No. 6,636,877.

(51) Int. Cl.
*G06F 17/30* (2006.01)

(52) U.S. Cl. .................. 707/203; 707/10; 707/104.1; 707/200; 379/83; 379/221.01

(58) Field of Classification Search ............... 707/1–10, 707/100–104.1, 200–206; 709/223; 455/432.3; 379/221.01, 83–84, 221.1
See application file for complete search history.

(56) References Cited

U.S. PATENT DOCUMENTS

| | | | |
|---|---|---|---|
| 4,599,490 A | 7/1986 | Cornell et al. | 455/439 |
| 5,420,917 A | 5/1995 | Guzman | 379/279 |
| 5,461,613 A | 10/1995 | Loebig | 370/58.3 |
| 5,784,449 A | 7/1998 | Ardon | 379/230 |
| 5,875,242 A | 2/1999 | Glaser et al. | 379/207 |
| 5,910,984 A | 6/1999 | Low | 379/279 |
| 5,913,160 A | 6/1999 | Leung | 455/403 |
| 5,937,343 A | 8/1999 | Leung | 455/403 |
| 6,098,076 A | 8/2000 | Rekieta et al. | 707/202 |
| 6,219,669 B1 | 4/2001 | Haff et al. | 707/10 |
| 6,230,164 B1 | 5/2001 | Rekieta et al. | 707/10 |

OTHER PUBLICATIONS

Cuka DA et al., Engineering domains: executable commands as an example, Jun. 2-5, 1998, IEEE, 26-34.*
Santoso D et al., A nonblocking multi-stage ATM switch using cell-based routing with a hierarchical cell sorting mechnism, May 24-27, 1999, 265-270.*

* cited by examiner

*Primary Examiner*—Jean B Fleurantin

(57) ABSTRACT

The system automatically generates electronic commands necessary to modify or provision different types of program control switches as may be included in a public switch telephone network. A data schema and organization of tables and data structures provide for command generation for each of the different switch types. Additionally, a self-modifying dynamic data structure is used as a common area to communicate information between various programs and formulate the commands due to a limited number of parameters used to communicate information between programs that generate the command for the switches. A technique for verifying switch commands automatically generated by a second new provisioning system is described. A technique is described for automatically extracting switch specific commands and options as generated by a first system for use in populating data stores used in a second system for command generation.

33 Claims, 41 Drawing Sheets

SRP TASKS
150

CSDLs and descriptions: 180 182

| CSDL | Description |
|---|---|
| C-ADD_HUNT_MEMBER | Adds another member to an existing hunt group |
| C-ADD_LH_SERVICE | Initializes a hunt group with one or more members |
| C-ADD_SERIES_MEMBER | Adds another member to an existing series-completion hunt group |
| C-ADD_VIRTUAL_ECF | Initializes a single line with virtual enhanced call forwarding service |
| C-CHANGE_BILL_MODE | Changes from flat rate to measured rate or vice versa |
| C-CHANGE_DIAL_MODE | Changes from dial pulse to touch call or vice versa |
| C-CHANGE_EQUAL_ACCESS | Changes long distance carrier(s) |
| C-CHANGE_FEATS | Modifies an existing service by adding or deleting features |
| C-CHANGE_HUNT_GROUP_SIZE | Changes the maximum size of a hunt group |
| C-CHANGE_HUNT_LNI | Changes line equipment for a member of a hunt group |
| C-CHANGE_HUNT_MEMBER_TDN | Changes the telephone number for a member of a hunt group |
| C-CHANGE_LINE_EQUIPMENT | Changes line equipment for an existing service |
| C-CHANGE_LINE_LOAD_CNTL | Changes the parameter that controls priority in service restoration after an outage |
| C-CHANGE_RCF | Changes the remote call forwarding number for an existing service |
| C-CHANGE_RING_CODE | Changes the ringing frequency for an existing service |

FIG. 10A

| | |
|---|---|
| C-CHANGE_RSOU | Changes the originating routing indicator |
| C-CHANGE_SMART_RING | Changes the distinctive ringing (teen) number |
| C-CHANGE_TDN | Changes the telephone number |
| C-CLEAR_LNP_TRIGGER | Clears the local number portability indicator |
| C-DELETE_HUNT_GROUP | Deletes a hunt group |
| C-DELETE_HUNT_MEMBER | Deletes a member of a hunt group |
| C-DELETE_LINE | Deletes a single line |
| C-DELETE_LNP_PORT | Deletes a line and sets an indicator that the telephone number is ported to another switch |
| C-DELETE_SERIES_MEMBER | Deletes a member of a series-completion hunt group |
| C-DEL_LH_SERVICE | Deletes a hunt group and all of its members |

| 180 | 182 |
|---|---|
| C-DEL_VIRTUAL_ECF | Deletes a service with virtual enhanced call forwarding |
| C-INIT_EDT_LINE | Initialize an express dial tone service (left-in-place vacant line) |
| C-INIT_HUNT_GROUP | Initialize a hunt group |
| C-INIT_HUNT_GROUP_PILOT | Initialize a hunt group pilot |
| C-INIT_NON_HUNT_LINE | Initialize a single line service |
| C-INIT_OPERATOR_INTCPT | Initialize operator intercept service |
| C-LINK_HUNT_GROUP | Connect two hunt groups together |
| C-LINK_SERIES_MEMBER | Connect one member of a series-completion hunt group to another member |
| C-MODIFY_LH_SERVICE | Modify the members of an existing hunt group |
| C-RAW_COMMAND | Send an already-generated command |
| C-REMOVE_OPERATOR_INTCPT | Remove a telephone number from operator intercept service |
| C-RESTORE_CARRIER | Restore long distance service to a single line after it was suspened |
| C-RESTORE_HUNT_GRP_LOCAL | Restore local service to a hunt group after it was suspended |
| C-RESTORE_LOCAL | Restore local service to a single line after it was suspended |
| C-SET_LNP_TRIGGER | Change a service from working to ported out status |
| C-SUSPEND_CARRIER | Suspend long distance service for a single line |
| C-SUSPEND_HUNT_GRP_LOCAL | Suspend local service for a hunt group |
| C-SUSPEND_LOCAL | Suspend local servive for a single line |
| C-UNLINK_HUNT_GROUP | Disconnect two hunt groups |

FIG. 11

CSDL Description:

This CSDL deletes a working service. The first ASDL is executed if the Smart Ring number is present on the Work Order, and determines the switch type. If the switch is a DMS-100, it sets the DMS100_SR parameter, which causes the second ASDL to be executed. If the switch is a 5ESS, it sets the 5ESS_SR parameter, which causes the third ASDL to be executed. For other switch types, it is not necessary to delete the Smart Ring number explicitly.

The second ASDL deletes the Smart Ring number if the switch is a DMS-100 and the Smart Ring number is defined. The third ASDL deletes the Smart Ring number if the switch is a 5ESS and the Smart Ring number is defined. The fourth ASDL deletes the line, and is always executed.

DETERMINE_SR

This state table prepares data for determining
if SMARTRING is present
It sets the SR parameter which causes the A-ADD_SMART_RING
ASDL to be executed in C-INIT_NON_HUNT_LINE
It also sets the DMS100_SR parameter which causes
the A-DELETE_SMART_RING ASDL to be executed
in C-DELETE_LINE (for DMS100 only)
This command determines switch type based on CLLI
code.

```
IF_THEN         '%TECH == "ESS5" '
    IF_THEN         '%SR_NUMBER DEFINED'
        SEND_PARAM      'SR "Y" C'
        SEND_PARAM      'ESS5_SR "Y" C'
    ENDIF

ELSE_IF         '%TECH == "DMS100" '
    IF_THEN         '%SR_NUMBER DEFINED'
        SEND_PARAM      'SR "Y" C'
        SEND_PARAM      'DMS100_SR "Y" C'
    ENDIF

ELSE_IF         '%TECH == "DMS10" '
    IF_THEN         '%SR_NUMBER DEFINED'
        SEND_PARAM      'SR "Y" C'
    ENDIF
ENDIF

ASDL_EXIT       'SUCCEED'
```

FIG 13

```
# This state table adds a single line to a VIDAR   220
        PAUSE       1
        RESPONSELOG
        CLEAR_VS

# This call puts the spaces into the line identifier  ⎫
        CALL        'LIB_UTIL::FORMAT_OE'              ⎬ 222
                                                       ⎭

# This call gets the primary class of service    ⎫ 224
        CALL        'LIB_UTIL::GET_SERVICE'
        CALL        'LIB_UTIL::GET_METRO'   226

EXEC_RPC  '%X=SSP_vidar_pcos:%CLLI_CODE:%METRO:%SERVICE_NAME:'
                                              280      284       286
      ⎧ IF_THEN    '%X.pcos_code NOT_DEFINED'
      ⎪   VS_SEND_RESP
  230 ⎨   ASDL_EXIT            'FAIL: DID NOT FIND PRIMARY CLASS CODE ...'
      ⎩ ENDIF

CALL        'LIB_VIDAR::VIDAR_PIC'

# The recent change configuration starts here      ⎫
        CONCAT    '%CMD=  BLA : :%TDN:'             ⎪
        CONCAT    '%CMD=%CMD: :%LEQ:'               ⎬ 232
        CONCAT    '%CMD=%CMD: :%X.pcos_code:'       ⎭

# This call gets any features ie:' custom calling features, etc.
      ⎧ CALL        'LIB_UTIL::ADD_FEATS'
      ⎪ IF_THEN    '%PARTY_POSITION == 11'
      ⎪   CONCAT        '%CMD=%CMD: 1:'
      ⎪ ELSE
      ⎪   CONCAT        '%CMD=%CMD: :%PARTY_POSITION:'
      ⎪ ENDIF
      ⎪
      ⎪ IF_THEN         '%INTER2 DEFINED'
  234 ⎨   CONCAT           '%CMD=%CMD: PIC1> :'
      ⎪   CONCAT           '%CMD=%CMD:%INTER2: '
      ⎪ ELSE
      ⎪   ASDL_EXIT        'FAIL: INTER access code is required'
      ⎪ ENDIF
      ⎪
      ⎪ IF_THEN         '%INTRA2 DEFINED'
      ⎪   CONCAT           '%CMD=%CMD: PIC2> :'
      ⎩   CONCAT           '%CMD=%CMD:%INTRA2 : '
  236  ENDIF
  238  SEND            '%CMD'
       SENDKEY         'ENT'             1
       CHAIN           'VIDAR_CHECK'
  240  VS_SEND_RESP
       ASDL_EXIT       'SUCCEED'
```

FIG. 15

Office description table

| Switch ID | Description |
|---|---|

Switch ID is used as a key to other tables. All other tables using Switch ID must have an entry in this table first.

310

Master switch table

| Switch ID | office | Switch number | software version | Time zone | type | number of digits to dial | group ID | remote call forward code | operator intercept code 1 | operator intercept code 2 | suspend code |
|---|---|---|---|---|---|---|---|---|---|---|---|

| default pay-per-use code | suspend long distance carrier code | suspend long distance carrier message | restore long distance carrier message | long distance carrier text | calling plan text | operator intercept code 3 | call blocking indicator | area code indicator | Account credit management indicator |
|---|---|---|---|---|---|---|---|---|---|

| operator intercept code 4 | express dial tone text | operator intercept code 5 | Restriction indicator | remote call forwarding indicator | remote call forwarding deletion text |
|---|---|---|---|---|---|

Type determines which other tables will contain data for this switch ID.
Account credit management indicator determines which column to use in Account credit management table.

Feature table 380

| Switch ID | Feature name | Text to add Feature | Text to remove Feature | Feature type code |
|---|---|---|---|---|
| | | | | |

Default Feature table 390

| Switch ID | Feature name | Service type |
|---|---|---|
| | | |

5ESS switch table 400

| Switch ID | Calling plan indicator | Service name | Rate area code | Line class code | Dialing indicator |
|---|---|---|---|---|---|
| | | | | | |

5ESS switch by telephone number table 410

| Switch ID | Calling plan indicator | Service name | Low end of telephone number range | High end of telephone number range | Rate area code |
|---|---|---|---|---|---|
| | | | | | |

— 412

DMS100 switch table 420

| Switch ID | Calling plan indicator | Service name | Equipment identifier | Local area transport ID | Line treatment group ID |
|---|---|---|---|---|---|
| | | | | | |

— 422

GTD5 switch table 430

| Switch ID | Calling plan indicator | Service name | Equipment identifier | Frame identifier | Service class code | Secondary service class code |
|---|---|---|---|---|---|---|
| | | | | | | |

— 432

DCO switch table 440

| Switch ID | Service name | Class feature indicator | Service class code |
|---|---|---|---|
| | | | |

DMS10 switch table 450

| Switch ID | Service name | Service Class code |
|---|---|---|

— 452

VIDAR switch table 460

| Switch ID | Calling plan indicator | Service name | Service Class code |
|---|---|---|---|

— 462

Siemens EWSD table 470

| Switch ID | Service name | Line class code | Rate area code |
|---|---|---|---|

— 472

Calling plan table 480

| Switch ID | Exchange code |
|---|---|

DMS100 long distance carrier code table 490

| Switch ID | Long distance carrier code | Translated long distance carrier code |
|---|---|---|

GTD5 hunt group table 500

| Switch ID | Calling plan indicator | Equipment identifier | Frame identifier | Long distance rate code | Other common carrier code | Outward billing mode | Centranet indicator |
|---|---|---|---|---|---|---|---|

— 502

DMS10 equipment prefix table 510

| Switch ID | Equipment prefix | Translated equipment prefix |
|---|---|---|

— 512

DMS10 error code table 520

| Error code | Severity indicator | Error text | comment |
|---|---|---|---|

— 514

FIG. 19A equipment translation table 530

| Switch ID | Equipment identifier | Translated equipment identifier |
|---|---|---|
| | | |

— 532

GTD5 traffic source table 540

| Feature type | Feature value | Long distance carrier code | Traffic source value |
|---|---|---|---|
| | | | |

— 542

GTD5 pay-per-use feature table 550

| User-based three way calling | User-based auto call return | User-based busy number redial | User-based customer-originated call trace | User-based caller no. delivery block | Switch ID | Three-way calling text |
|---|---|---|---|---|---|---|
| | | | | | | |

— 552 equipment identifier format table 560

| Switch type | Switch software version | Equipment identifier mask |
|---|---|---|
| | | |

— 562

Service names table 570

| Service name identifier | Service name | comment |
|---|---|---|
| | | |

Order type table 580

| Class ID | Type code | Hunt group code | Hunt group indicator | Member indicator | New telephone number |
|---|---|---|---|---|---|
| | | | | | |

```
WC is HK77127 ... Sclli is now > LNLKFLXA99H <─── 760

┌ The 5ess_rax_lcc table has entries for LNLKFLXA99H
762┤
  │ From the 5ess_rax_lcc Table:
  │ raxkeys: (
  │ > │ │ )
  │ lckeys: (
  │ 4IE │ 4IA │ 2MU │ 2MR │ 2M9 │ 2GA │ 2FX │ 2FR │ 2FF │ 2FD │ 2F9 │ 1W8
  │ 1W6 │ 1W3 │ 1W0 │ 1PD │ 1P2 │ 1P1 │ 1MU │ 1MR │ 1MF │ 1MD │ 1M9 │ 1LD
764┤ 1GA │ 1FX │ 1FR │ 1FF │ 1FD │ 1F9 │ 1EX │ 1CN │ 058 │ 057 │ 048 │ 047
  │ )
  │ cidialkeys: (
  │ DENY │ )
  │ sustkeys: (
  │ Y │ N │ )
  │ suspendtxtkeys: (
  └ TDZ │ TDY │ TDU │ )
  <
766 ─── The ring_code table has NO entries for LNLKFLXA99H
768 ─── The Switch Feature table has entries for LNLKFLXA99H
770 ─── The Switch Clli Table has entries for LNLKFLXA99H
```

FIG. 25A

```
              MFRI=Y ⎫
                     ⎬─772
>
>FORM=1V6&NEW, TN=9963395, SET="CHNGOE.ENTYPE"&"L", SET="CHNGOE.LEN"&"0030
011110", RAX=1, LCC=1FR, MFRI=Y, CHNGPTY=5, TCC=Y, PIC=5483, PTC=5483, NEW!<
>LNEW="FL.F"&"/SCRFRG" ⎫
>FORM=1V8&CHG, TN=9963395, LNEW="FL.F"&"/SCRFRG", CHG!< ⎬─774
>LNEW="FL.F"&"/CWC1"<
>FORM=1V8&CHG, TN=9963395, LNEW="FL.F"&"/CWC1", CHG!<
>LNEW="FL.F"&"/LIRCNMA"<
>FORM=1V8&CHG, TN=9963395, LNEW="FL.F"&"/LIRCNMA", CHG!<
>LNEW="FL.F"&"/MW3WC"<
>FORM=1V8&CHG, TN=9963395, LNEW="FL.F"&"/MW3WC", CHG!<
            UCR=Y<    >FORM=1V6&CHG, TN=9963395, UCR=Y, CHG!<
            CIDCW=Y<  >FORM=1V8&CHG, TN=9963395, CIDCW=Y, CHG!<
^
>SET="OE.LEN", LCC=1OI, ICP=Y<
>FORM=1V6&NEW, TN=9299607, SET="OE.LEN", CHNGPTY=I, RAX=1, LCC=1OI, ICP=Y, NEW
!<
           ⎫
   MFRI=Y< ⎬─778
           ⎭
>FORM=1V6&NEW, TN=9963251, SET="CHNGOE.ENTYPE"&"L", SET="CHNGOE.LEN"&"0010
020111", RAX=1, LCC=1FR, MFRI=Y, CHNGPTY=5, TTC=Y, PIC=0288, NEW!<─782
           ⎫
   MFRI=Y< ⎬
           ⎭
>FORM=1V6&NEW, TN=9950156, SET="CHNGOE.ENTYPE"&"L", SET="CHNGOE.LEN"&"0030
011152", RAX=1, LCC=1MR, MFRI=Y, CHNGPTY=5, TCC=Y, PIC=5483, PTC=5483, NEW!<
           ⎫
   MFRI=Y< ⎬
           ⎭
>FORM=1V6&NEW, TN=9967273, SET="CHNGOE.ENTYPE"&"L", SET="CHNGOE.LEN"&"0030
002003", RAX=1, LCC=1FR, MFRI=Y, CHNGPTY=5, TCC=Y, PIC=9000, PTC=9000, NEW!<
```

776 { (left brace grouping the block above starting with ">")
780 { (left brace grouping the lower block)

FIG. 25B

```
> LOUT="FL.F"&"/LAC1"<
>FORM=1V8&CHG, TN=9963013, LOUT="FL.F"&"/LAC1", CHG!<
>LNEW="FL.F"&"/LIRCNMA"<
>FORM=1V8&CHG, TN=9963013, LNEW="FL.F"&"/LIRCNMA", CHG!<
>LNEW="FL.F"&"/CFBLAC", LNEW="CF.F"&"/CFBLAC"-"CF.F"&"/CFBLAC"-
"CF.DN"&"8139967826"<
>FORM=1V8&CHG, TN=9966030, LNEW="FL.F"&"/CFBLAC", LNEW="CF.F"&"/CFBLAC", LC
HG="CF.F"&"/CFBLAC"-"CF.F"&"/CFBLAC"-"CF.DN"&"8139967826", CHG!<
>LCHG="CF.F"&"/CFBLAC"="CF.SI"&"3", LCHG="CF.F"&"/CFBLAC"-"CF.T"&"0"<
>FORM=1V8&CHG, TN=9966030, LCHG="CF.F"&"/CFBLAC"-"CF.F"&"/CFBLAC"-
"CF.SI"&"3", LCHG="CF.F"&"/CFBLAC"-"CF.T"&"0", CHG!<
>LNEW="FL.F"&"CFDAVMS", LNEW="CF.F"&"CFDAVMS", LCHG="CF.F"&"CFDAVMS"-
"CF.DN"&"8139967826"<
>FORM=1V8&CHG, TN=9966030, LNEW="FL.F"&"CFDAVMS", LNEW="CF.F"&"CFDAVMS", LC
HG="CF.F"&"CFDAVMS"-"CF/DM"&"8139967826", CHG!<
>LCHG="CF.F"&"CFDAVMS"-"CF.SI"&"3", LCHG="CF.F"&"CFDAVMS"-
"CF.T"&20, LCHG="CF.F"&"CFDAVMS"-"CF.B"&"Y"<
>FORM=1V8&CHG, TN=9966030, LCHG="CF.F"&"CFDAVMS"-
"CF.SI"&"3", LCHG="CF.F"&"CFDAVMS"-"CF.T"&20, LCHG="CF.F"&"CFDAVMS"-
"CF.B"&"Y", CHG!<
> LNEW="FL.F"&"VMAIL"<
>FORM=1V8&CHG, TN=9966030, LNEW="FL.F"&"VMAIL", CHG!<
> LOUT="FL.F"&"/CFV"<
>FORM=1V8&CHG, TN=9966030, LOUT="FL.F"&"/CFV", CHG!<
   MFRI=Y<
>FORM=1V6&NEW, TN=9959097, SET="CHNGOE.ENTYPE"&"L", SET="CHNGOE.LEN"&"0010
035142", RAX=1, LCC=1FR, MFRI=Y, CHNGPTY=5, TTC=Y, PIC=0333, PTC=0333, NEW!<
>
> LNEW="FL.F"&"/CWC1"<
>FORM=1V8&CHG, TN=9959097, LNEW="FL.F"&"/CWC1", CHG!<
```

FROM FIG. 26A

```
    ARALW=<      >FORM=1V6&CHG, TN=9959097, ARALW=N, CHG!<
    ACALW=<      >FORM=1V6&CHG, TN=9959097, ACALW=N, CHG!<
    USTWCALW=<   >FORM=1V6&CHG, TN=9959097, USTWCALW=N, CHG!<
>LOUT= "FL.F "&"/LAC1"<
>FORM=1V8&CHG, TN=9959149, LOUT= "FL.F "&"/LAC1, CHG!<
>LNEW= "FL.F "&"/LIRCNMA"<
>FORM=1V8&CHG, TN=9959149, LNEW= "FL.F "&"/LIRCNMA", CHG!<
>LOUT= "FL.F "&"/CWC1", CHG!<
>FORM=1V8&CHG, TN=9962010, LOUT= "FL.F "&"/CWC1", CHG!<
    ARALW=<      >FORM=1V6&CHG, TN=9966047, ARALW=N, CHG!<
    ACALW=<      >FORM=1V6&CHG, TN=9966047, ACALW=N, CHG!<
    USTWCALW=<   >FORM=1V6&CHG, TN=9966047, USTWCALW=N, CHG!<
>LNEW= "FL.F "&"/SCRFRG"<
>FORM=1V8&CHG, TN=9960240, LNEW= "FL.F "&"/SCRFRG", CHG!<
>LNEW= "FL.F "&"/CWC1"<
>FORM=1V8&CHG, TN+9960240, LNEW= "FL.F "&"/CWC1", CHG!<
>LNEW= "FL.F "&"/LIRCNMA"<
>FORM=1V8&CHG, TN=9960240, LNEW= "FL.F "&"/LIRCNMA", CHG!<
>LNEW= "FL.F "&"/CFV"<
>FORM=1V8&CHG, TN=9960240, LNEW= "FL.F "&"/CFV", CHG!<
```

784

Leftover words for 2434 records from LNLKFLXA99H, HK77127 were:
{MFRI=Y | LNEW= "FL.F "&"/SCRFRG" | LNEW= "FL.F "&"/CWC1" | LNEW= "FL.F "&"/LIRCNMA
" | LNEW= "FL.F "&"/MW3WC" | UCR=Y | CIDCW=Y | SET= "OE.LEN" | LCC=10I | ICP=Y | LOUT= "F
L.F "&"/LAC1" | LNEW= "FL.F "&"/CFBLAC" |

LNEW= "CF.F "&"/CFLCAC"|LCHG= "CF.F "&"/CFBLAC"-
"CF.DN "&"8139967826"|LCHG= "CF.F "&"/CFBLAC"-
"CF.SI "&"3"|LCHG= "CF.F "&"/CFBLAC"-
"CF.T "&"0"|LNEW= "FL.F "&"/CFDAVMS"|LNEW= "CF.F "&"CFDAVMS|LCHG= "CF.F "&"CFD
AVMS"- "CF.DN "&"8139967826"|LCHG= "CF.F "&"CFDAVMS"-
"CF.SI "&"3"|LCHG= "CF.F "&"CFDAVMS"-"CF.T "&20|LCHG= "CF.F "&" CFDAVMS"-
"CF.B "&"Y"|LNEW= "FL.F "&"VMAIL"|LOUT= "FL.F "&"/CFV"
ARALW=|ACALW=|USTWCALW=|LOUT= "FL.F "&"/CWC1"|LNEW= "FL.F "&"/CFV"|G"|PLIT=
Y|LOUT= "FL.F "&"/ SCRFRG"|LOUT= "FL.F "&"/MW3WC"|UCRACTIVE=|UCR=N|SUSO=|
LNEW= "FL.F "&"/LAR1"|LNEW= "FL.F "&"/LAC1"|LOUT= "FL.F "&"/SCAFR" |CIDCW=|LOU
T= "FL.F "&"/SC1C"|COTALW=|LNEW= "FL.F "&"/SDAFR"|LNEW= "FL.F "&"/SCAFR"|LNEW
= "FL.F "&"/COT1" |LNEW= "FL.F "&"/SCFFR" |LNEW= "FL.F "&"/SC2C" |LOUT= "FL.F "&"/
LIRCNMA"
PRIVACY=Y|LNEW= "FL.F "&"/DIGA"|BLK1PLUS=NONE|COIN=DTF|PCPALW=|LOUT= "FL.F
"&"VMAIL"|LOUT= "FL.F "&"/CFBLAC"|LOUT= "FL.F "&"CFDAVMS"|LOUT= "FL.F "&"CFDA
CCR"|LNEW= "FL.F "&"/ASPTERM"|FORM=1V64&CHG|TN=9950064|
FEATURE="/ASPTERM"|SET= "TA.TRIGNBR "&"12"|SET= "TA.TRIGACT "&"Y"|SET= "INTE
R "&"3"|LOUT= "FL.F "&"/LAR1"|LOUT= "FL.F "&"/SDAFR"|LOUT= "FL.F "&"/SCFFR"|LO
UT= "FL.F "&"/SC2C"|LNEW= "FL.F "&"ACMTLBLK"|ANI7=Y|LOUT= "FL.F "&"/LICNDA"|L
NEW= "FL.F "&"/SC1C"|
PRIVACY=|LOUT= "FL.F "&"/DIGA"|ARALW=Y|ACALW=Y|JUSTWCALW=Y|LNEW= "FL.F "&"/L
ICNDA"|LOUT= "FL.F "&"ACMTLBLK"|ANI7=|SERHLN=9963691|LCC=E
F1|FORM=1V11&CHG|
TN=9963277|LNEW= "FEATLIST.FEATURE "&"/CFR"|FORM=1V22&CHG|FEATURE="/CFR"|
FWDTODN=8139299347|SERHLN=9961754|SERHLN=966575|SERHLN=9967195|SERHLN=
9961735|SERHLN=9961864|)

FROM FIG. 27A

788 — Switch Features Table words for LNLKFLXA99H, HK77127, were:
(N|L|, USTWCALW=Y, CHG|, UCRACTIVE=N, UCR=N, CHG|, LOUT= "FL.F "&"CFVBL", CHG|, L
OUT= "FL.F "&"CFDAF", CHG|, LOUT= "FL.F "&"CFBLF", CHG|, LOUT= "FL.F "&"/SDAFR", C
HG|, LOUT= "FL.F "&"/SCRFRG", CHG|, LOUT= "FL.F "&"/SCRFFR", CHG|, LOUT= "FL.F "&"/
SCAFR", CHG|, LOUT= "FL.F "&"/SC2C", CHG|, LOUT= "FL.F "&"/SC1C", CHG|, LOUT= "FL.
F "&"/MW3WC", CHG|, LOUT= "FL.F "&"/MSAAVM", CHG|, LOUT= "FL.F "&"/MSAAD", CHG|, L
OUT= "FL.F "&"/LIRCNMA", CHG|, LOUT= "FL.F "&"/LICNDA", CHG|, LOUT= "FL.F "&"/LAR
1", CHG|, LOUT= "FL.F "&"/LAC1", CHG|, LOUT= "FL.F "&"/DIGA", PRIVACY=N, CHG|, LOU
T= "FL.F "&"/CWT", CHG|, LOUT= "FL.F "&"/CWC1", CHG|, LOUT= "FL.F "&"/CFV", CHG|, L
OUT= "FL.F "&"/CFBLAC", CHG|, COTALW=N, CHG|, CIDCW=N, CHG|, ARALW=Y, CHG|, ACALW
=Y, CHG|)

784

The Switch CLLI table has entries for LNLKFLXA99H

The 5ess_rax_lcc table has entries for WSSDFLXADS0 raxkeys: (
1|)

lcckeys: (

| 4IE | 4IA | 2MU | 2MR | 2M9 | 2GA | 2FX | 2FR | 2FF | 2FD | 2F9 | 1W8 |
| 1W6 | 1W3 | 1W0 | 1PD | 1P2 | 1P1 | 1MU | 1MR | 1MF | 1MD | 1M9 | 1LD |
| 1GA | 1FX | 1FR | 1FF | 1FD | 1F9 | 1EX | 1CN | 058 | 057 | 048 | 047 |

)

cidialkeys: (
DENY|)

sustkeys: (
Y|N|)

FIG. 27B suspendtxtkeys: (
TDZ | TDY | TDU | )
)

Entries for LNLKFLXA99H, HK77127, were not found in the ring_code Table

FIG. 28

| SERVICE ORDER ID | SERVICE NAME | FEATURE NAMES |
|---|---|---|
| 1 | 009C11AB8D00 | 900BOTH 976NPA PUS TC LH LHTSCP 1PTY MR GS SWFBOTH TRBOTH |
| 2 | 1082 | RES 1PTY TC FR LS SWFBOTH |
| 3 | 22732 | 900BOTH BUS TC INTRZ9 LH LHMSEQ 1PTY MR LS SWFTERM |

FIG. 32 ized to perform a certain function. One application includes the generation of electronic commands necessary to provision, modify and delete service with regard to telephone subscription service. In particular, electronic commands may be switch specific commands where a switch is included in the Public Switch Telephone Network (PSTN).

METHOD FOR ANALYZING THE QUALITY OF TELECOMMUNICATIONS SWITCH COMMAND TABLES

CROSS-REFERENCE TO RELATED APPLICATIONS

The instant application is a continuation under 37 CFR 1.53(b) of U.S. application Ser. No. 09/400,050, filed Sep. 21, 1999 now U.S. Pat. No. 6,636,877, which is hereby incorporated herein by reference in its entirety. The benefit of an earlier filing date under 35 U.S.C. § 120 is claimed.

FIELD OF THE INVENTION

The invention generally relates to systems and methods executed in a computer system, and more particularly to systems and methods for analyzing the quality of command generation performed automatically in a computer system.

BACKGROUND OF THE INVENTION

There are many applications in which commands may be generated automatically to perform a certain function. One application includes the generation of electronic commands necessary to provision, modify and delete service with regard to telephone subscription service. In particular, electronic commands may be switch specific commands where a switch is included in the Public Switch Telephone Network (PSTN).

In some systems and applications, an existing system is replaced by a more updated system which generates commands, such as the electronic commands, for execution by various telephone switches. In this particular instance, a technique may be used to verify the correctness of the new system replacing an existing system with regard to the commands generated by the new system in an automated and more efficient fashion. However, one of the problems is how to verify the correctness of the new commands generated by the new system in comparison with those of the existing system. One technique is to perform a manual comparison by having a person examine the commands generated by the existing system and those generated by the new system. If there is a match, such as by string or character-by-character comparison, then it may be concluded that the commands generated by the new system are correct. However, this presents several problems in that having a user manually compare these commands, such as by visual comparison, is often inefficient and may introduce unnecessary human error.

An improvement upon this technique is to provide an automated system for comparing the commands such as by a character or string comparison of the existing system commands with those generated by the new system. However, even with an automated method for comparison, additional problems may exist. For example, the commands generated by the two systems may not be identical. In other words, commands may perform equivalent functions but may not be string character identical. For example, features or parameters for a particular command may be in different orders. Additionally, there may be a command generated by the new system which is equivalent to the command generated and used in an existing system. For example, the new provision existing may generate three commands which perform the same function as a single command in an existing provisioning system or vice versa. Neither one is incorrect, however it is difficult to come up with a technique for performing verification of all of these possibilities.

Thus, what is desired is an efficient and flexible system for verifying the quality of the commands automatically generated in a computer system.

SUMMARY OF THE INVENTION

In accordance with principles of the invention is a method executed in a computer system for verifying generated commands. A subset of actual commands generated by a first system is determined. Using data tables used by a second system in command generation, it is determined if the second system is capable of generating one or more commands equivalent to a first command included in the subset.

In accordance with another aspect of the invention is a system for verifying generated commands used in a computer system. Included is means for determining a subset of actual commands generated by a first system. Additionally included is means for determining, using data tables used by a second system in command generation, if the second system is capable of generating one or more commands equivalent to a first command included in the subset.

In accordance with yet another aspect of the invention is a system for verifying commands. Included are machine executable instructions for determining a subset of actual commands generated by a first system. Also included are machine executable instructions for determining, using data tables used by a second system in command generation, if the second system is capable of generating one or more commands equivalent to a first command included in the subset.

Thus, there is provided an efficient and flexible system for verifying the quality of the commands automatically generated in a computer system.

BRIEF DESCRIPTION OF THE DRAWINGS

Features and advantages of the present invention will become more apparent from the following detailed description of exemplary embodiments thereof, taking in conjunction with the accompanying drawings, in which:

FIGS. 10 and 11 are examples of embodiment of the various service or work order types;

FIG. 13 is an example of an embodiment of a program for generating a command switch as identified in FIG. 12;

FIG. 15 is an example of an embodiment of another program for generating a command switch;

FIGS. 25 through 28 are an example of an embodiment of various reports generated by the analysis program and the embodiment of FIG. 22;

FIG. 32 is an example of an embodiment of the order identifier table included in the system of FIG. 29.

DETAILED DESCRIPTION OF PREFERRED EMBODIMENTS

Figure 1:
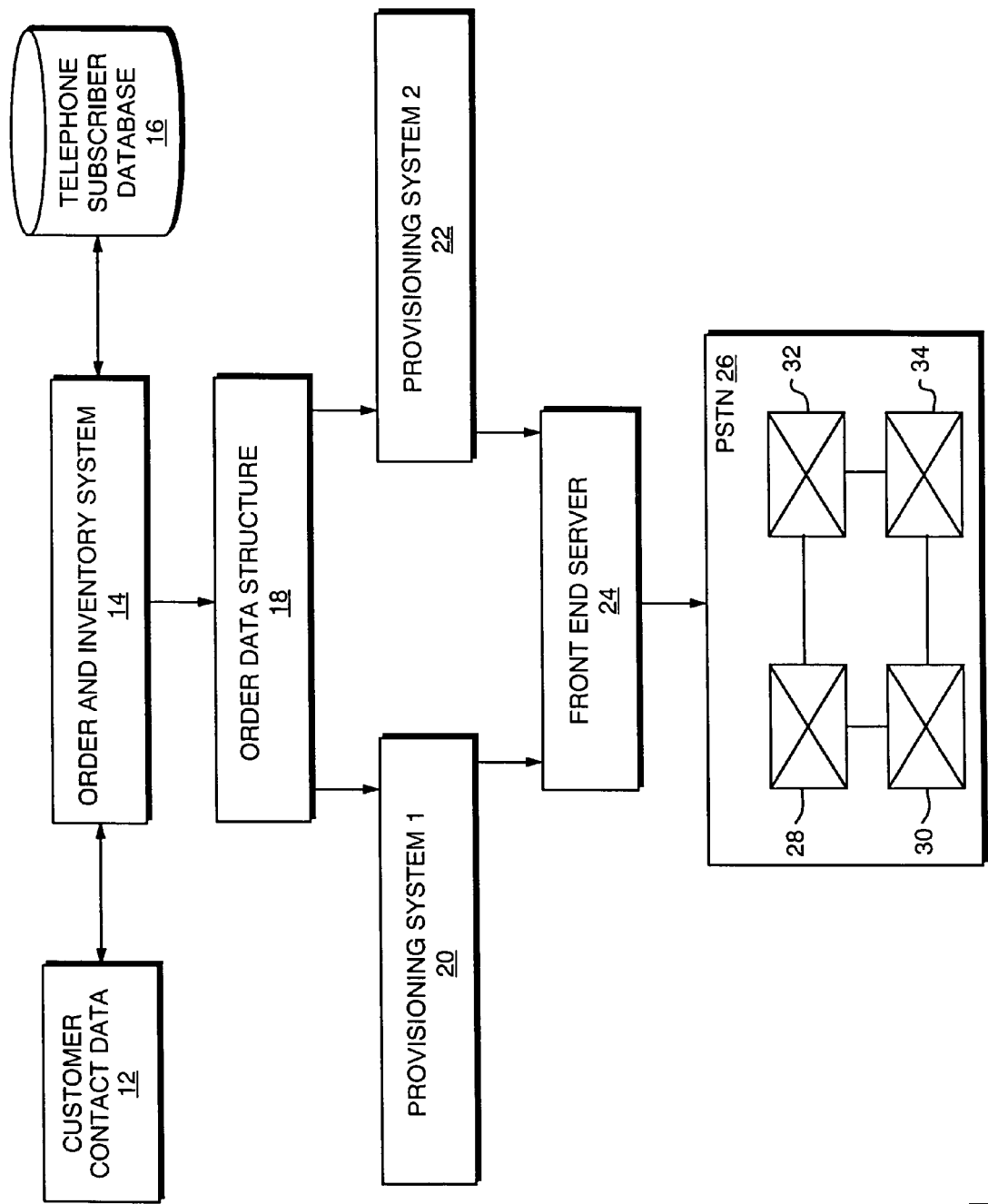
FIG. 1 is an example of an embodiment of a system that includes the invention.

Referring now to FIG. 1, shown is an example of an embodiment of a system used to generate electronic commands to provision and change service in the PSTN. Generally, the system 10 of FIG. 1 includes components of a system as well as data flow inputs and outputs with regard to the various system components. Customer contact data 12 is input into an order and inventory system 14. The order and inventory system 14 obtains necessary telephone subscriber database information from the telephone subscriber database 16 to produce a work order. In this embodiment, the work order is in the form of an order data structure 18 produced by the order and inventory system 14. The order data structure 18 is used as input to one or more provisioning systems 20 and 22. Generally, the provisioning systems take as input the work order and output the necessary commands to the front end server 24 to modify subscriber information in the PSTN 26.

In the system 10 of FIG. 1, shown are two provisioning systems, provisioning system 1, and provisioning system 2, 22. In this particular embodiment, the provisioning system 1 may be an existing system in the process of being replaced by a second provisioning system 22. In this particular embodiment of FIG. 1, the two provisioning systems may be used alternately depending on which system has been selected for use for operation in the system 10 of FIG. 1. For example, if there is a problem experienced in testing and putting the provisioning system 2 on-line, the provisioning system 1 may be selected for operation rather than the new provisioning system 2. Thus, the embodiment of FIG. 1 is one particular embodiment in which a new system may be in operation as a phase-in process for replacing an existing system such as element 20. Each of the provisioning systems as will be described in the paragraphs that follow, output commands for particular switches which arrive at the front end server 24.

In this embodiment, the front end server 24 is generally a computer system which acts as an interface or a front end to the public switch telephone network or PSTN 26. Generally, the PSTN 26 includes a plurality of switching circuits 28, 30, 32 and 34. It should be noted that other embodiments may include a different number of switches. Generally, the PSTN is given instructions or programmed by commands as passed through the front end server 24 regarding service options for a particular phone number, or to set particular service or subscriber options. For example, as will be described in paragraphs that follow, various commands for a new subscriber for a telephone service may be formulated in the form of a work order as an order data structure 18 produced by the order and inventory system 14. A new telephone subscriber information may be input through customer contact data 12 as by an agent through manual operation and input to the order inventory system 14. In turn, the order and inventory system may produce and record information in the telephone subscriber database 16 with the new subscriber's telephone number. To begin service on a particular date, for example, a work order is produced in the form of an order data structure 18. This order data structure 18 is an input to one or both of the provisioning systems in operation which output the switch commands for this particular subscriber to enable service on a particular date. These commands are forwarded to the front end server 24 which then passes these commands to program one of the switches as may be included in the PSTN 26 for the particular subscriber.

Generally, the provisioning systems, such as provisioning system 1 and 2 of the system 10 of FIG. 1, are a collection of software programs executing on a computer system that together generate electronic commands to provision, modify, and delete service in different types of stored program controlled telephone switches as may be includes in the PSTN 26 of FIG. 1. For example, the switches that may be included in the PSTN 26 include an AT&T GTD-5, Nortel DMS-100, Nortel DMS-10, AT&T 5ESS, Vidar, Siemens DCO and Siemens EWSD switches.

It should be noted, as will be described in paragraphs that follow, that different commands are generated by each of the provisioning systems in accordance with the different types of switches that may exist in the PSTN. Also, in the embodiment of FIG. 1 in this particular example, the provisioning system 1, 20 is an existing system to be replaced by a more updated flexible system, provisioning system 2, 22. Provisioning system 1 in this particular embodiment includes existing computer programs which are not written in modular form and are difficult to maintain. For example, the existing code included in the provisioning system 1, 20 includes knowledge about specific requirements for different switch types imbedded in the code. As a result, maintenance of this code is difficult as well as adding new switches and code for these switches into the existing system with the particular coding model used which is non-modular. Thus, it is being replaced by a second provisioning system 22 which is deemed to be more efficient and flexible. However, phasing in the real time system provisioning system number 2 is needed such that if a problem is encountered with the second positioning system, a switch over to the use of the first or existing provisioning system 20 is performed. Thus, this is the reason for the two provisioning systems included in this particular example and the embodiment of the system of FIG. 10.

It should be noted that other embodiments and applications may include more provisioning systems or less provisioning systems. For example, once the first provisioning system has been deemed obsolete and a second provisioning system is been deemed thorough tested, the first provisioning system 20 in FIG. 1 is removed and the order data structure 18 serves as an input only to provisioning system 2, 22. As will be described in paragraphs that follow, the second provisioning system 22 generates a variety of commands for a variety of different switch types as previously described. The new and improved provisioning system 22 includes modular code which provides for flexible system maintenance and reusable code.

In this embodiment, the switches that may be included in the PSTN are stored program control switches. Generally as known to those skilled in the art, each of these switches has a memory which may vary in size which has it own particular command set. Generally, a command is forwarded from the front end server 24 to each of the switches as directed for a particular telephone subscriber. The various switches each respond back to the front end server with regard to the status of the command completion. For example, the status may be "success" or "failure". This status is further forwarded from the front end server 24 to the provisioning systems 20 and 22 as will be described in paragraphs that follow.

Generally, the front end server 24 acts as an interface between the provisioning system and the PSTN. The front end server 24 in this particular embodiment includes support for the TCP/IP protocol and translates any incoming commands for use in accordance with the X.25 standard protocol as understood by those switches included in the PSTN 26. Thus, the front end server 24 acts as an interface between the TCP/IP standard and the X.25 standard.

The provisioning system 22 as will be described in paragraphs that follow in this particular embodiment includes use of the Automatic Service Activation Program™ (ASAP™) application which is generally an infrastructure product produced by Architel Systems Corporation™. It should be noted that other systems may be used in other embodiments to implement systems in accordance with the principals of the invention as will be described herein.

In this embodiment, the provisioning systems, such as provisioning system 1 and provisioning system 2 included in the system 10 of FIG. 1, are executed on a computer system that has the HP/UX operating system with a Sybase database management system. The ASAP™ system by Architel™ is included in the provisioning system 22.

It should be noted that each of the provisioning system and the other components included in the system 10 of FIG. 1 may be associated with various hardware configurations. In one embodiment, for example, the order and inventory system 14, each of the provisioning systems and the front end server 24 each execute on dedicated processors in different computer systems. However, as known to one of ordinary skill in the art, other hardware configurations are possible in accordance with principles of the invention as described herein.

It should be noted that in one particular embodiment, for example, the order and inventory system 14 and the telephone subscriber database 16 each run on a commercially available IBM mainframes. Provisioning system 1 may execute on a single computer system or a combination of commercially available processors that together form the provisioning system 1. Provisioning system 2 may be a commercially available processor from Hewlett Packard, such as the K460, running HP UX Unix. The front end server 24 may be a commercially available processor running IBM AIX.

Figure 2:
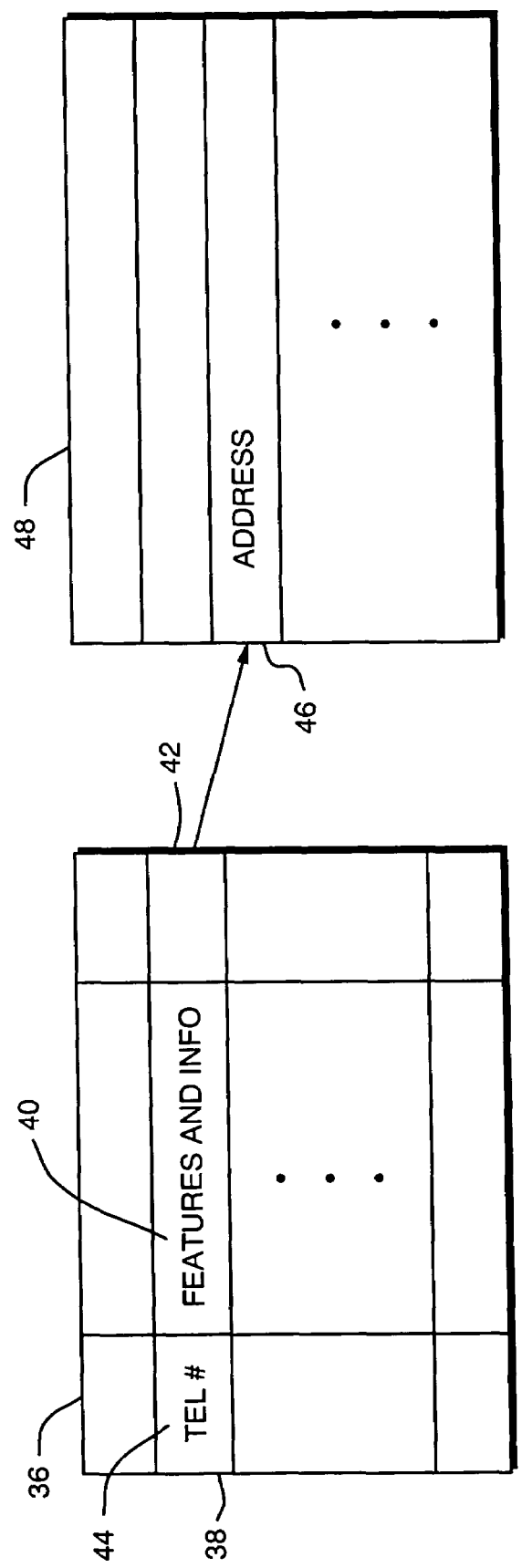
FIG. 2 is an example of an embodiment of a record structure as may be included in the telephone subscriber database of FIG. 1.

Referring now to FIG. 2, shown is an example of data structures in the form of tables as may be included in the telephone subscriber database 16 of FIG. 1. Generally, shown in FIG. 2 are two tables 36 and 48. The first table 36 includes telephone number and feature information for a subscriber. The second table 48 includes address information. In this particular embodiment, the telephone number of record 38 may be used as an index into the table 36 for an existing customer. Associated with a particular telephone number 44 are various features and other information 40. Additionally, associated with a particular telephone number 44 for a particular record is a pointer or identifier 42 to address information 46 for a particular subscriber. The address information in this particular embodiment is organized in a second separate table 48.

This particular type of data arrangement may be used in the order and inventory system 14 of FIG. 1, for example, when the customer contact data input into the order and inventory system may include information for a new or existing subscriber for a telephone service. For example, if there is information being input into the order and inventory system for a change order for an existing telephone subscriber, a telephone number exists already for that subscriber and information may be obtained and stored from these tables accordingly by indexing into table 36 by telephone number. However, if a customer or subscriber is new and does not have an existing telephone number in the database, table 36 may not initially be used. Thus, information is input into table 48 including information about the address of the subscriber. Subsequently, the order and inventory system 14 determines a telephone number which is available by looking into the telephone subscriber database. For a new subscriber the process works in reverse in that the address information may be input first. A telephone number may be determined which is available and inserted into the table 36. Subsequently, this newly created telephone number and information is associated with the address information in table 48.

It should be noted that other embodiments of the telephone subscriber database and other information may be included in the database. This is one particular organization of telephone subscriber information. It should also be noted that other embodiments of the system 10 of FIG. 1 may include multiple order and inventory systems, for example, where there are multiple order data structures output into a single provisioning system as well as multiple provisioning systems.

Figure 3:
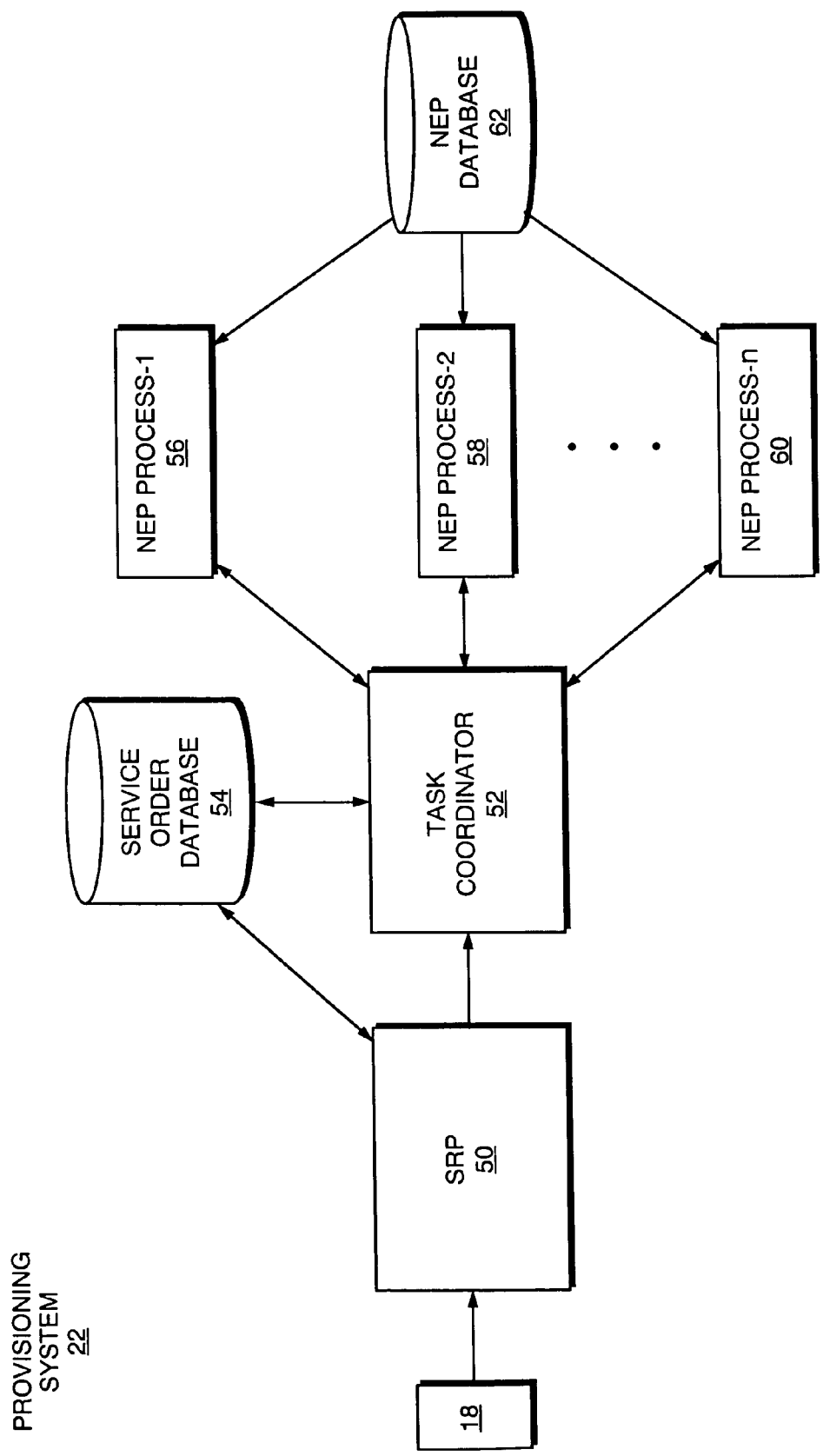
FIG. 3 is an example of a provisioning system that may be included in the system of FIG. 1.

Referring now to FIG. 3, shown is an example of a provisioning system 22 as may be included in the system of FIG. 1. It should be noted that the provisioning system 22 is an example of an embodiment of the newer provisioning system 22 which is being phased in to replace and older existing system 20. Input into the provisioning system 22 is the order data structure 18 produced by the order and inventory system 14 previously shown in FIG. 1.

In one embodiment, the input order data structure 18 may be an existing order data structure that is put in a new and improved format as used within the provisioning system 2. For example, the order data structure 18 may be a fixed length record with a fixed format. In one embodiment, this data structure 18 may include over 100 fields including record type, order number, switch number, telephone number, class identifier indicating feature data, transaction type and the like. Data included in different fields may have different meanings based on values included in other fields. Other embodiments may include different formats and fields for the order data structure 18 in accordance with the features and applications of the other embodiments.

The order data structure 18 is input to the service request processor (SRP). Generally, the SRP receives orders, translates or reformats them in accordance with another data structure, assigns an order type to the work order, and enters information into the service order database 54. Generally, as will be described in more detail the order types are defined as common service description layers or CSDLs. The SRP 50 interacts with the task coordinator 52. Generally, the SRP stores the orders in the database. The task coordinator 52 selects the orders according to due date and status. The task coordinator 52 communicates to the SRP when an order is completed and the corresponding final status. Subsequently, the SRP communicates this information to the order and inventory system. This processing is described in more detail in paragraphs that follow.

It should also be noted that in this embodiment, the SRP and the task coordinator are daemons that execute independent of each other on a computer system of the provisioning system 2. Other embodiments may implement each of these using various techniques known to those skilled in the art and in accordance with each embodiment.

The task coordinator 52 queries or retrieves information from the service order database as needed in accordance with processing various service or work orders. For example, the task coordinator 52 may retrieve records from the service order database 54 with regard to a particular due date and all of the work orders which must be processed by a particular date and/or time.

Generally, the task coordinator 52 serves as a task allocator and coordinator of the various work orders to be processed. The task coordinator 52 determines which network element process (NEP) produces the various commands corresponding to a particular order. In this particular embodiment, the task coordinator determines which NEP processes a particular order in accordance with a switch identifier, or switch id. In this particular embodiment, the task coordinator may read a switch id mapping into an NEP process table from the service order database 54. Generally, this table maps a particular switch identifier or group of identifiers to a particular NEP process. At start up, the task coordinator may read this table from the service order database so that it knows how to partition the various work orders.

It should be noted that a switch identifier is a unique identifier of one of the switches included in the PSTN 26. Each switch identifier uniquely identifies a physical switch included in the PSTN 26 of FIG. 1. In this particular embodiment, it should be noted that the task coordinator 52, the SRP 50, and each of the NEPs 56 through 60 may be written in the C programming language. In this particular embodiment they are included as part of the ASAP™ package or software produced by Architel Systems Corporation™. In this particular embodiment, the SRP may be modified in accordance with the particular data structure, for example, as well as other system particularities which may vary with each embodiment. The NEP and task coordinator are commercially available programs included with the ASAP™ applications which are not generally modified. However, other embodiments may provide similar function as will be described in this application to perform the functions in accordance with principles of the invention.

In this particular embodiment, there are 25 NEP processes. Other embodiments may include more or less number of NEP processes as well as determine which processes perform a process the various orders as determined by the task coordinator. Generally, a load balancing technique is incorporated into the task coordinator 52 by using a switch identifier as an index into NEP process tables read in at task coordinator start up. These tables, as previously described, perform the function in this embodiment of load balancing the various NEP processes to process the service or work orders included in the service order database 54. This table may be modified in accordance with the various work order or switch ID mappings with the goal of having efficient system performance.

In this particular embodiment, it should be noted that the switch identifier which is used as an index to a table to determine which NEP process processes this particular work order is an eleven character unique identifier. Also, in this embodiment, the load balancing and the division of which switch identifier is associated with a particular process for processing a work order is based on historical data gathered from execution of the system 10 of FIG. 1. In other words, in this particular embodiment it is determined that based on past performance and statistics gathered at various points in the system, particular switch identifiers have an associated throughput or load of a number of work orders. Accordingly, the system is load balanced for current use based on this past data gathering. Other embodiments may use other techniques for determining this mapping.

In this embodiment NEP 56 through 60 are identically coded modules. The task coordinator 52, in its initialization, may also input a CSDL- ASDL table. This CSDL-ASDL mapping table lists for each particular CSDL or work order type, one or more associated command types or ASDLs to be associated with a particular work order type. For example, if an order is for an initialization of service, a CSDL is associated with this work or service order type representing this initialization of service. Accordingly, this CSDL or service order type is associated with one or more ASDLs or command types to accomplish the type of service associated with a particular service order type. It is one of the functions of the task coordinator to read the CSDL-ASDL tables on start up and determine for a particular order retrieved from the service order database 54 what ASDL commands are needed to carry out the operations associated with a particular service or work order type. Generally, each CSDL may be broken down into sub processing steps, each of the sub processing steps may be associated with an ASDL.

Subsequently, for each ASDL command, the task coordinator interacts with the associated NEP process to execute the appropriate command for the particular switch. The task coordinator sends a message to the NEP process which includes the ASDL command, the switch identifier associated with a particular work order, and other data necessary to carry out the ASDL command as may be identified for example in the work order. The NEP process then retrieves the program from the NEP database 62 and executes the appropriate program in accordance with the ASDL command for a particular switch to generate the commands which are sent to the front end server to the particular switch as identified in this system 10 of FIG. 1.

Figure 4:
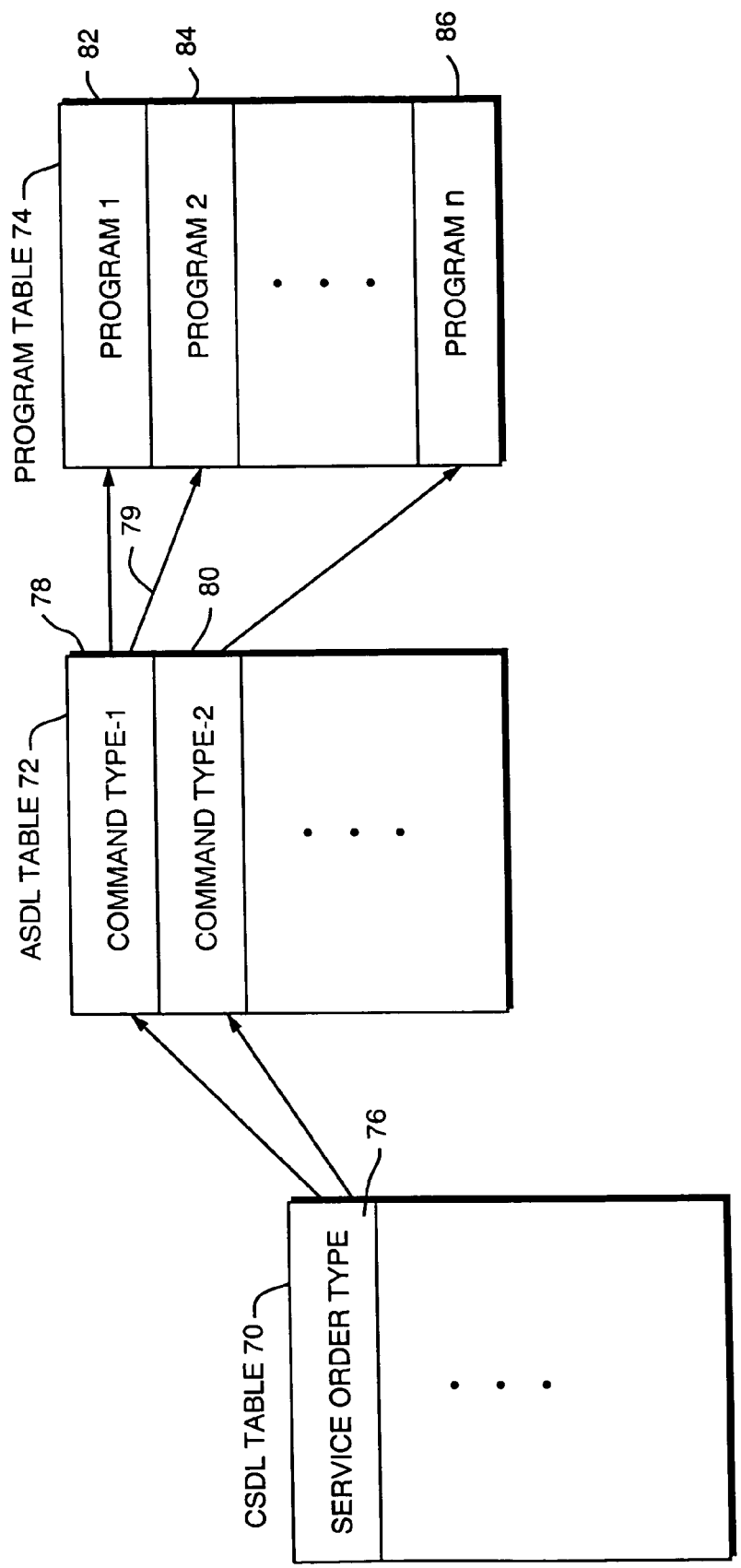
FIG. 4 is an example of an embodiment of the various tables used in automatic program generation in the provisioning system of FIG. 3.

Referring now to FIG. 4, shown is an example of an embodiment of how the various CSDL-ASDL and program tables interact to facilitate the generation of the various switch commands. It should be noted that the various tables identified in FIG. 4 may be used by the task coordinator and NEP process to determine which program to execute. Shown in FIG. 4 is a CSDL table 70, an ASDL table 72, and a program table 74. The CSDL table 70 includes various service order types as will be described in paragraphs that follow. The CSDL 70 maps service order types to one or more ASDL commands or command types as may be included in the ASDL table 72. In this particular example shown in FIG. 4, the service order type 76 requires the execution of two command types 78 and 80 as included in the ASDL table 72 to fully implement the service order type 76. The first step in generating the commands necessary to carry out the service order type 76 are those associated with command type 78. Recall that the task coordinator determines the CSDL to ASDL mappings. Thus the task coordinator retrieves and stores the information as may be included in the CSDL and ASDL tables describing what ASDLs are associated with what particular CSDLs.

In this particular embodiment, for example, these tables and information may be stored in a service order database 54. Information is sent to the appropriate NEP process in accordance with the previously described load balancing tables also read by the task coordinator for the service order database 54. Once the NEP process has been transmitted the correct information with regard to ASDL, the NEP then maps a particular ASDL to a particular program. This precise mapping, such as for a particular ASDL 78 mapping to a particular program 82 as included in the program table 74, will be described in more detail in paragraphs that follow using various pieces of data and other information. Generally, the program table 74 in this particular embodiment may be implemented as records stored in the NEP database 62.

The model used in the table mappings provided by FIG. 4 associates one service order with one or more command types which must be performed in combination to accomplish generating the commands associated with a particular service order type. The mapping from a particular command type, such as 78, to a particular program, such as 82, maps a single command type to a single program as may be included in the program table 74. In other words, for each command type such as 78, one program is selected from the program table 74 to be executed. It should be noted that each command type, such as command type-1 78, may be associated with one or more of the programs, such as 78 and 79, included in the program table. However, to be distinguished from the CSDL to ASDL mappings, only one program is executed for a particular ASDL in this embodiment. This is in contrast to the CSDL, ASDL mapping where more than one ASDL command may be executed sequentially to accomplish generating the commands for a particular service order. It should be noted that in this embodiment, the ASDL to program mapping tables may be stored in the NEP database 62 since it is used and accessed by the NEP processes. Other embodiments may include other data storage and management configurations.

Figure 5:
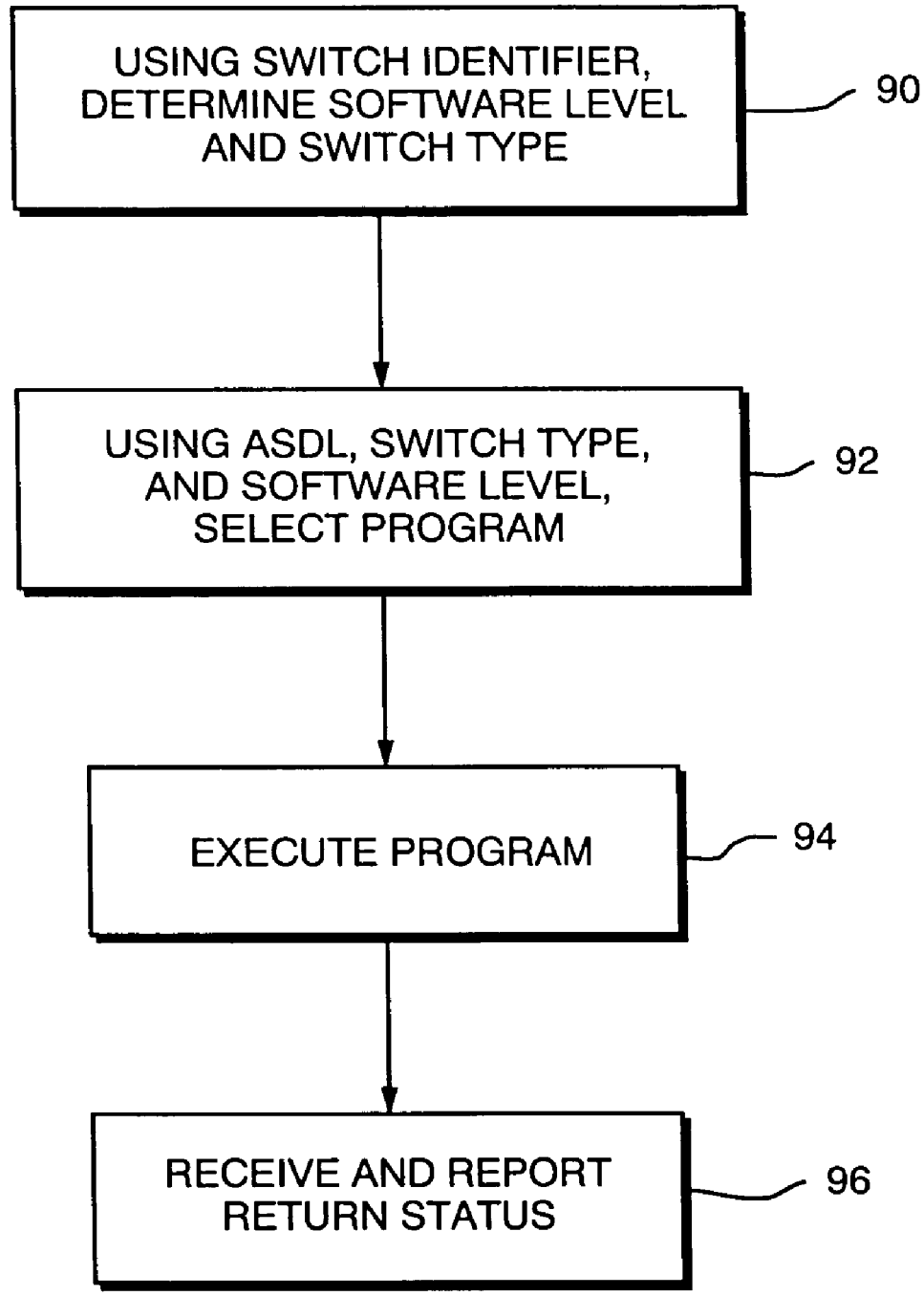
FIG. 5 is a flow chart of steps of a method of one embodiment for determining what program to execute to generate a switch command.

Referring now to FIG. 5, shown is an example of an embodiment of the steps included in a flow chart as may be performed by the NEP process in selection of a particular program in reporting the status to the task coordinator. At step 90, the NEP uses the switch identifier to obtain the software level and software type associated with a particular switch identifier. Generally, this information may be included in a tabular format stored in the NEP database 62 indexed by switch identifier as a key that returns the software level and the software type of a particular switch identifier. At step 92, using the ASDL as sent in the message by the task coordinator, the switch type and software level as determined by the look up in the table in NEP database 62 from step 90, a program is selected for execution. Similarly, these program tables as indexed by ASDL, switch type and software level may be stored in the NEP database 62. In other words, using as a key the ASDL, the switch type and the software level, a particular program name is selected and returned as a result of output from a database query 62.

At step 94, a designated NEP process executes the program as may be stored in the NEP database 62. At step 96, upon subsequent program execution, the NEP process receives the status after the execution of the program and the command by the switch, and reports status results to the task coordinator 52.

It should be noted that the various programs previously described executed by the NEP process are stored in this embodiment in the NEP database 62 as a variety of records. An example of the various programs executed by the NEP process are described in more detail in paragraphs that follow.

It should be noted that as previously described only one program of one or more programs is executed for each ASDL or command type defined in the ASDL table 72 in this embodiment. Each program as may be included or identified in the program table 74 generates a different commend in accordance with the switch type and software level. One aspect of the technique incorporated in the tables of FIG. 4 is to reduce the number of CSDLs or service order types by embedding software type dependencies in the ASDL and program choosing process. Thus, each of the order type or service orders as included in the CSDL table 70 are independent of switch type. Generally, in this embodiment, a switch type is associated with a particular type of switch as may be included in the PSTN. This switch type is generally a vendor categorization about a particular switch identifier in accordance with, for example, the make and model of a particular switch. Thus, what is described herein is a unique way for choosing the various service order types and ASDL organizations and the mappings between the CSDL, ASDLs, and the various programs executed. Using the various mapping techniques described herein, ASDLs may be reused in up to more than one CSDL. Similarly, the code associated with each of the programs included in the program table may be executed more than one time by being associated with more than one ASDL. This reuse of code as well as the fact that each ASDL may be mapped or associated with more than one CSDL may result in decreasing storage space by reuse of the commands and associated programs. This provides for efficient use of data storage and may increase the maintainability of a particular system by having one copy of a particular code segment which may be reused several times. Thus, when a particular program segment requires modification, this may generally be performed on a single copy of the code. In summary, the multiple level mappings and hierarchy as set forth in the tables in FIG. 4 provide for code reuse, facilitate modular program design, and facilitate a flexible and maintainable system.

Figure 6:
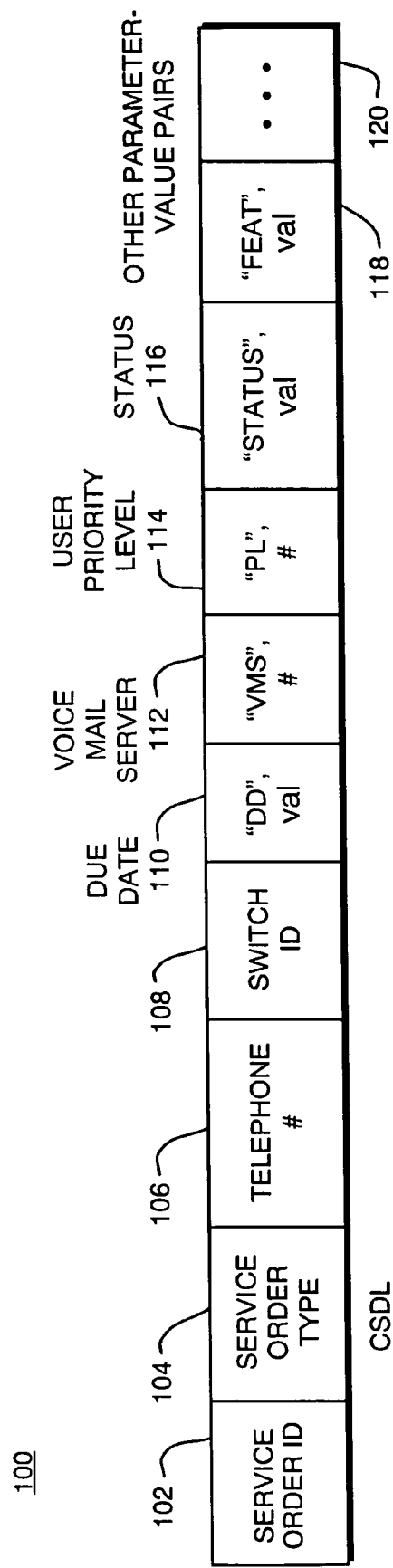
FIG. 6 is an example of an embodiment of a data structure that represents a work order as generated in the system of FIG. 1.

Referring now to FIG. 6, shown is an example of an embodiment of the data structure that may be initialized by the SRP 50 and stored in the service order database 54. The data structure 100 includes several different types of information. Generally, some of this information may be obtained from the order data structure 18 which is input into the SRP 50. Other types of information are filled in by the SRP by looking up information from the service order database 54. In this particular embodiment, the data structure 100 includes a service order ID 102. The service order ID uniquely identifies this particular work order. The service order ID is obtained from the order data structure 18 in this particular embodiment. The service order type 104 or CSDL is determined by the SRP. In this particular embodiment, the SRP determines the service order type by accessing an order type table.

It should be generally noted that tables, such as the order type table, that will be described in conjunction with FIG. 6 will be described in more detail in accordance with other Figures in paragraphs that follow. An embodiment of the order type table is described in conjunction with other Figures. However, note that the service order type or CSDL is determined by performing a look up in accordance with the table stored in the service order database 54 of FIG. 3 by using information obtained from the order data structure 18 as an index to obtain the order type or CSDL included in field 104. The telephone number 106 associated with a particular work order is obtained from the input order data structure 18. Similarly, the switch identifier 108, due date 110, user priority level 114, various features identified as parameter values 118 and 120 are also obtained from the order data structure 18. The switch identifier 108 uniquely identifies a particular switch within the PSTN 26 for this particular subscriber. The due date 110 identifies the date by which this order must be processed. The voice mail server 112 is obtained by the SRP if voice mail is an option for this particular user by working in the voice mail server identifier tables. A detailed description of this particular table will be described in conjunction with other Figures. User priority level 114 may be input from the original order data structure identifying the particular priority of this work order request. For example, if a user or subscriber has service that has been affected by a disaster, such as a hurricane or flood with only partial service restoration at first, the user priority level maybe elevated as indicated by field 114 of the data structure to determine the priority level as to which subscribers' service will be restored first, such as restoring service to a hospital or police station prior to a resident. The status 116 indicates the status of this work order as, for example, whether it has been processed successfully or failed, or whether it has yet to be completed. Other features associated with a particular work order request 18 may appear in fields 118 through 120.

It should generally be noted that features such as due date, voice mail server, user priority level, status and others as may be associated with the work order data structure 18 are parameter-value pairs in this embodiment. In other words, they are pairs of information where a first parameter may be an alphanumeric string identifying a particular feature, and the second parameter is a value, such as a numeric value or a character or string, associated with or giving an instantiation of a particular feature.

It should be noted that what has just been described in conjunction with FIG. 6 for data structure 100 is one particular embodiment of the data structure as may be produced by the SRP and stored in the service order database. Other embodiments may include different data structure organizations in accordance with the various features of that particular system. Additionally, one feature of this data structure is the parameter value pairs to describe the various features. Another type of general data organization to describe the different features or items associated with a work order data structure may be used in other embodiments.

Figure 7:
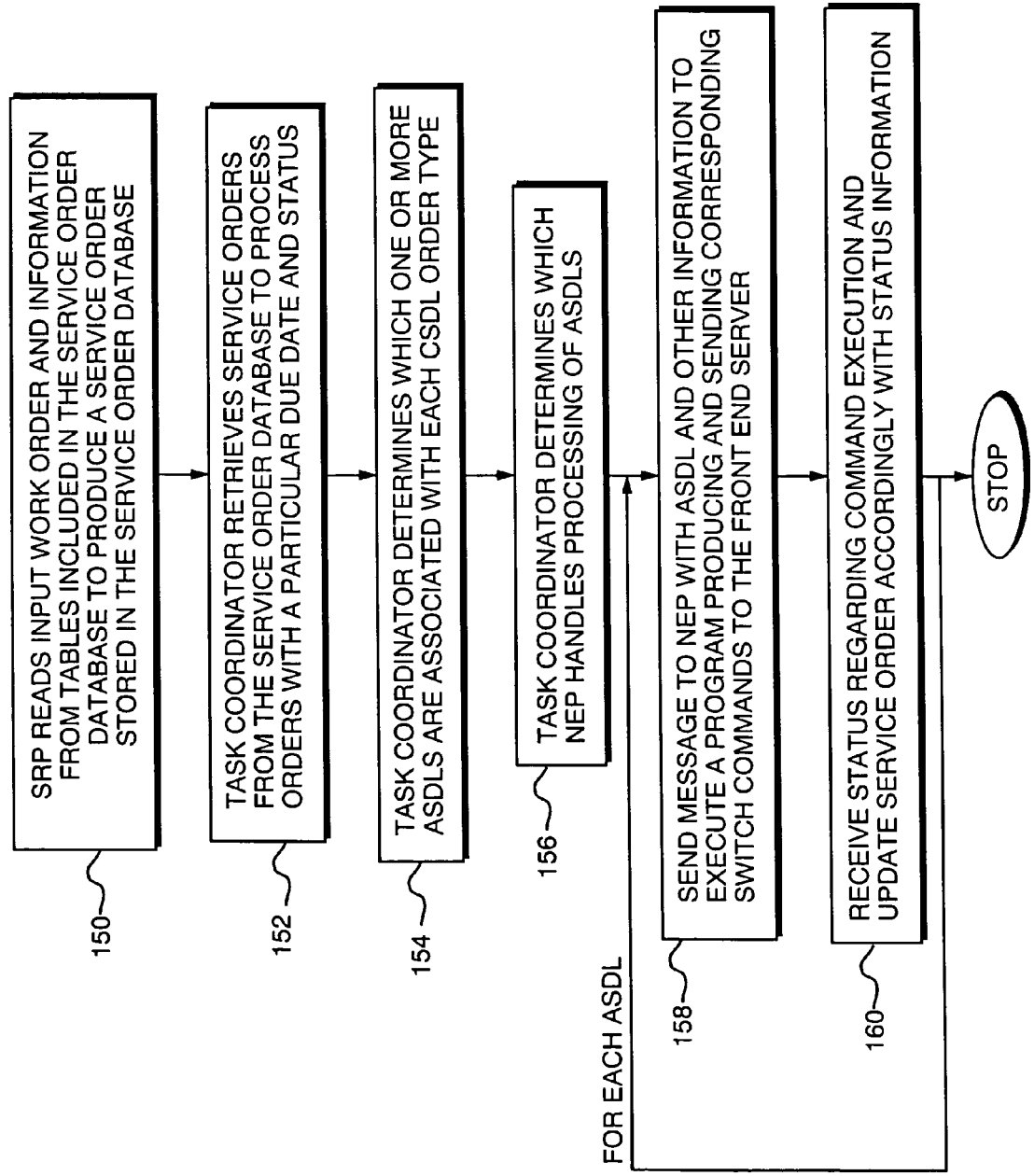
FIG. 7 is an example of an embodiment of a flow chart including method steps that may be performed in processing a work order.

Referring now to FIG. 7, shown is a flowchart of the method steps of tasks performed in a provisioning systems to produce the various switch commands in accordance with a particular switch type and a subscriber's work order. At step 150, the SRP reads the input work order and information from tables included in the service order database to produce a service order which is stored in the service order database. Generally, the SRP uses information incoming in the data structure 18 and various tables as stored in the service order database 54 to produce a work order which is stored and used further in the provisioning systems. This work order in this embodiment is stored in the service order database 54.

At step 152, the task coordinator retrieves the service order as input to the service order database by the SRP 50. The task coordinator retrieves service orders from the service order database to process orders with a particular due date and status. It should be noted that in other embodiments, other criteria may be used by the task coordinator to retrieve service orders. In this particular embodiment, the task coordinator retrieves service orders in accordance with due dates and status of initialized or not completed yet. Thus, these orders are retrieved by the task coordinator from the service order database 54 to be completed by generating switch commands.

At step 154, the task coordinator determines which one or more ASDLs or commands types are associated with each CSDL order type. Recall that a CSDL service or work order type is a particular type of order such as a new service order, a modification to a subscription of telephone service, or deletion of a subscription. Other systems may include other order types. For each of these order types, one or more ASDL or command types are associated with each of these CSDLs. For example in order to modify a particular service having five parameters or feaures, there may be 5 ASDLs associated with this CSDL. Each ASDL is associated with producing one switch command which is executed by the switch. Thus, if one CSDL may be further divided into one or more atomic units, each of these one or more atomic units correspond to a particular program executed to produce a single command for the switch.

At step 156, the task coordinator determines which NEP handles processing of the ASDLs associated with each CSDL in step 154. For each ASDL, the steps 158 and 160 are executed. At step 158, a message is sent to the appropriate NEP with the ASDL and the other information needed to execute a program producing and sending corresponding switch commands to the front-end server. Generally, the task coordinator produces a message including necessary information for the NEP to produce select a particular program in accordance with a particular switch type and information to produce a switch command and equipped with a particular work order and switch type.

At step 160, a status is received from the NEP process regarding the status of command execution. Accordingly, the task coordinator updates the status field of the service order data structure to be described in paragraphs that follow. It should be noted that the status information and other pieces of feature information may be included in the service order data structure stored in service order database 54. In this particular embodiment, the status information is stored as a feature value pair with "STATUS" indicating the field or feature name, and a status value accordingly being an alphanumeric or numeric value, indicating the status of the current associated service order. For example, the status of a service order may be "completed" and a numeric order or alphanumeric string may be used to indicate this value. It should be noted that other types of values may also indicate the status value stored in the service order data structure in the database 54. Steps 158 and 160 are repeated for each ASDL associated with the CSDL order type as determined in Step 154. Upon completion, the task coordinator stops processing associated with this particular work order.

Figure 8:
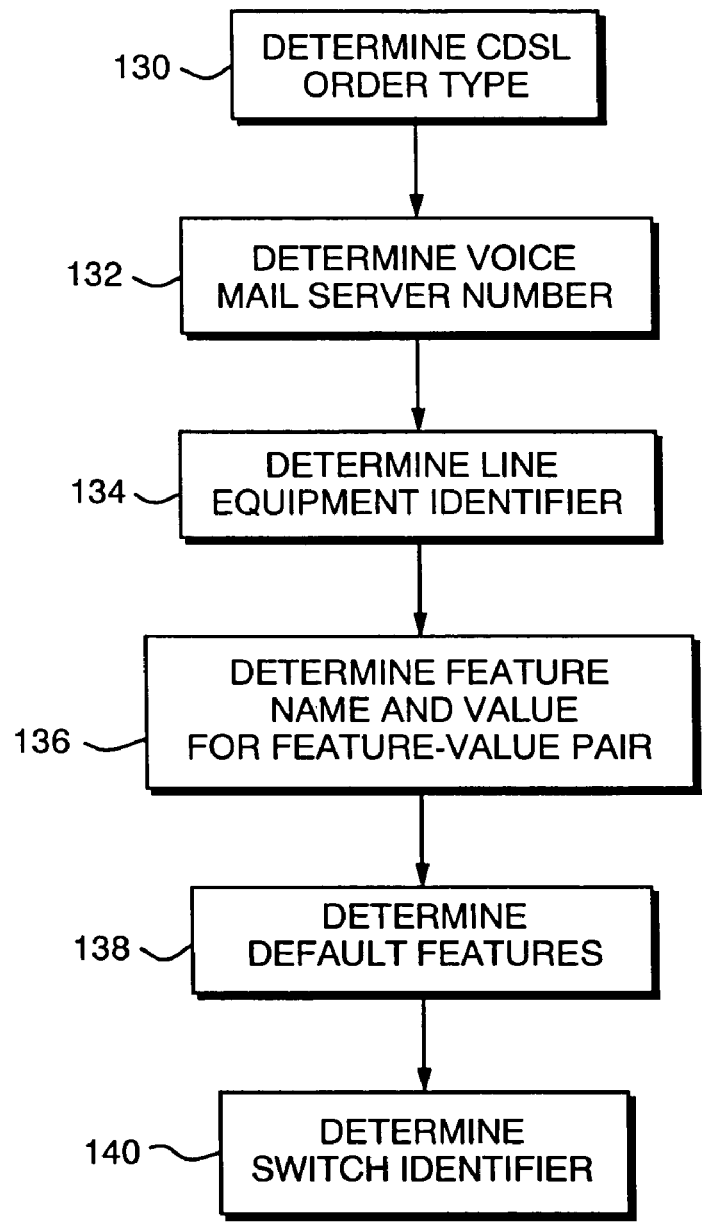
FIG. 8 is an example of a embodiment of a flow chart including method steps that may be performed by a service request processor in the system of FIG. 3.

Referring now to FIG. 8, shown is flowchart of the steps of a method of certain tasks performed by the SRP 50 of the provisioning system of FIG. 3. At step 130, the SRP determines the CSDL order type. The SRP determines the order type using subscriber information obtained from the order in the structure 18 from the order type table which will be described in paragraphs that follow as contained in this embodiment in the service order database 54. At step 132, the voice mail server number is determined. This may be determined by the SRP in conjunction with using the voice mail server table as will be described in conjunction with other figures in paragraphs that follow. Similar to the order type table, the voice mail server table and other tables which will be described in conjunction with steps that follow are stored in the service order database 54 of FIG. 3 and access by the SRP.

At step 134, the line equipment identifier is determined for the particular subscriber. The SRP may determine this by using an equipment translation table which outputs for a particular switch identifier and equipment identified and translated equipment identifier for that particular equipment according to the particular subscriber's hardware and connection. At step 136, using a feature identifier as may be included in the data structure for the work order form 18, a feature name and value as included in the feature value pair of a data structure to be stored in a service order database are determined. The feature name is determined by using the feature name table which will be described in the paragraphs that follow to determine feature name or value.

At step 138, the default features are determined using a default feature table which will also be described in paragraphs that follow. Generally, the default feature may be a default subscriber's feature in accordance with a particular geographic area or other designation. For example, the default feature for a particular state may be dial pulse. A default feature table gives a default feature value for a particular name of a feature. At step 140, a switch identifier is determined using the switch identifier table as will be described in paragraphs that follow as well. Additionally, other information may be obtained by the SRP using tables stored in the service order database 54 to complete an order data structure which will be stored in the service order database.

Generally, one technique used by the SRP is to make use of some values provided in the input data structure from the work order 18 in conjunction with table lookups, as stored in the service order database 54, to fill in fields included in a new order data structure stored in the service order database 54.

Figure 9:
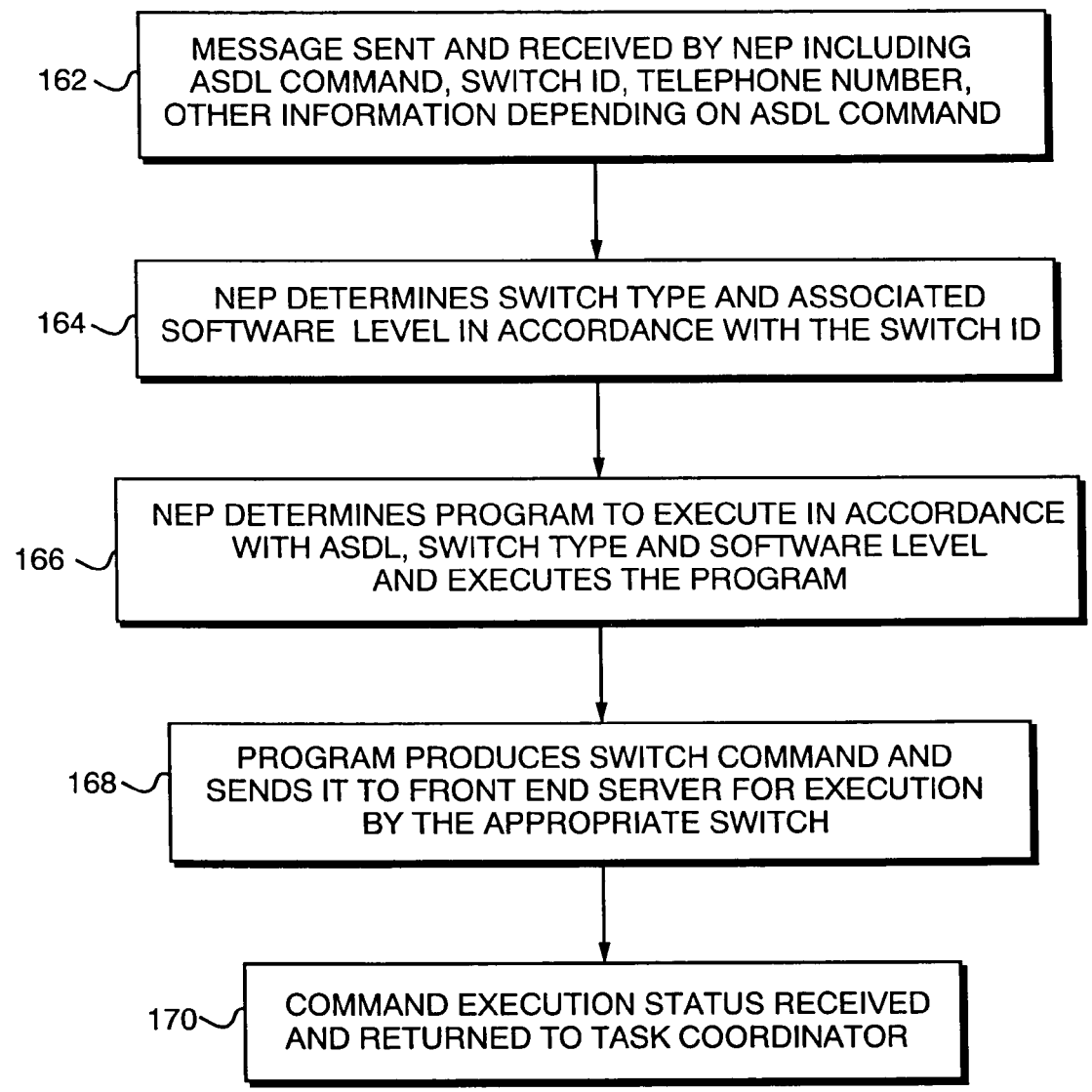
FIG. 9 is an example of an embodiment of a flow chart including method steps that may be performed by a network element process included in an embodiment of a provisioning system.

Referring now to FIG. 9, shown is a flowchart of an embodiment of method steps and tasks performed by the NEP in this embodiment. It should be noted that the steps outlined in this flowchart are only some of those steps which may be performed by the NEP in this allocation of tasks to the NEP. Additional tasks may be performed by the NEP in accordance with other embodiments. At step 162, a message sent by the task coordinator is received by the NEP. In this particular embodiment, the message may include the ASDL command, switch identifier, a telephone number, and any other information dependent on the particular ASDL command.

At step 164, the NEP determines the switch type and associated software level in accordance with a switch ID. In this particular embodiment, this may be performed by the NEP accessing information that may be stored in the table in the NEP database 62. In one embodiment, the NEP database may be an SQL-compliant database which retrieves or returns the switch type and software level when the switch ID is used as an index of a particular table.

At step 166, the NEP determines the program to execute in accordance with the ASDL, the switch type, and the software level. Similar to the technique used in step 164, this information may also be retrieved from the NEP database 62 by performing an SQL query command which returns a particular program name given the ASDL, switch type and software level used as an index. At step 166, the NEP executes this program.

In this particular embodiment, the program is executed by the Architel™ software system. Other embodiments may use other techniques in accordance with each specific embodiment and implementation.

In this embodiment, the NEP interprets the instructions associated with each program, and starts a new thread for each order. It should be noted that to process a single order several programs may have to be executed in sequence. Each program may be handled by the same thread which ends execution when the order is complete.

At step 168, the program executed in step 166 produces a switch command and sends it to the front-end server 24 for execution by the appropriate switch. It should be noted that in this particular embodiment, a messaging scheme may be used to send the command to the front-end server. This may be in the form, for example, in this embodiment of a TCP/IP message command. At step 170, command execution status is received by the NEP also in the form of a message and returned to the task coordinator accordingly. It should be noted that command execution status is forwarded from the switch to the front-end server, which then further forwards it to the NEP in the form of a message. Command execution status may be, for example, "success" or "failure" indicating the status of the command executed by the switch as associated with the ASDL.

It should be noted that each NEP process in this embodiment using the ASAP™ application is a multi-threaded process written in the "C" programming language. The NEP process executes programs that are written in an interpretive language by Architel™ which generates machine executable code. Other embodiments may employ other techniques in accordance with the software and hardware included in the implementation.

It should be noted that in this particular embodiment, a parameter provided is the maximum number of threads per process. Other embodiments may have other mechanisms for controlling the number of threads associated in a particular process. Additionally, even using the existence of a multi-threaded process is highly dependant upon the underlying software system and capabilities thereof in accordance with each particular embodiment.

It should be noted that each program is written in a scripted interpreted language which is specific to this implementation by Architel™.

Referring now to FIGS. 10 and 11, shown is a table of various service or work order CSDL types and their associated description in one particular embodiment of the invention. Generally, the CSDL or the work order type is shown in column 180 with a corresponding description in column 182. The various CSDLs included in column 180 may be used, for example, in the field 104 of data structure 100 as included in FIG. 6 for the service order types. Generally, these various service or work order types (CSDLs) have been categorized such that they are switch independent. In other words, each of these CSDLs represents a first in a series of hierarchies as shown in FIG. 4 with the various ASDLs and programs to produce a data scheme for accessing information in which the CSDLs are switch independent. It is a design decision in this embodiment to embed the switch type dependencies in the hierarchy in levels other than at the top level of the service order type. This is one of the techniques used in this particular embodiment to minimize the impact of adding the difference switch or modifying a particular switch type upon an existing data accesses in the system. This facilitates maintenance as well as the debugging when changes are made to the system as shown in FIG. 1.

The various CSDLs or work order types are used to add, change, delete, initialize, link, restore or suspend various telephone services of a particular subscriber. For example, in column 180 number 184 included is a CSDL or work order type for deleting a particular telephone subscriber line service. Record 186 of FIG. 11 shows C-SUSPEND_LOCAL which is the corresponding work order or service order type to suspend local service for a single line. This may be used, for example, when an individual has not paid a various portion of their phone bill.

It should be noted that other embodiments may include other service order types in accordance with the various application. It should generally be noted that one feature of particular importance as described is that the CSDLs or work order types are independent of the switch type.

Figure 12A:
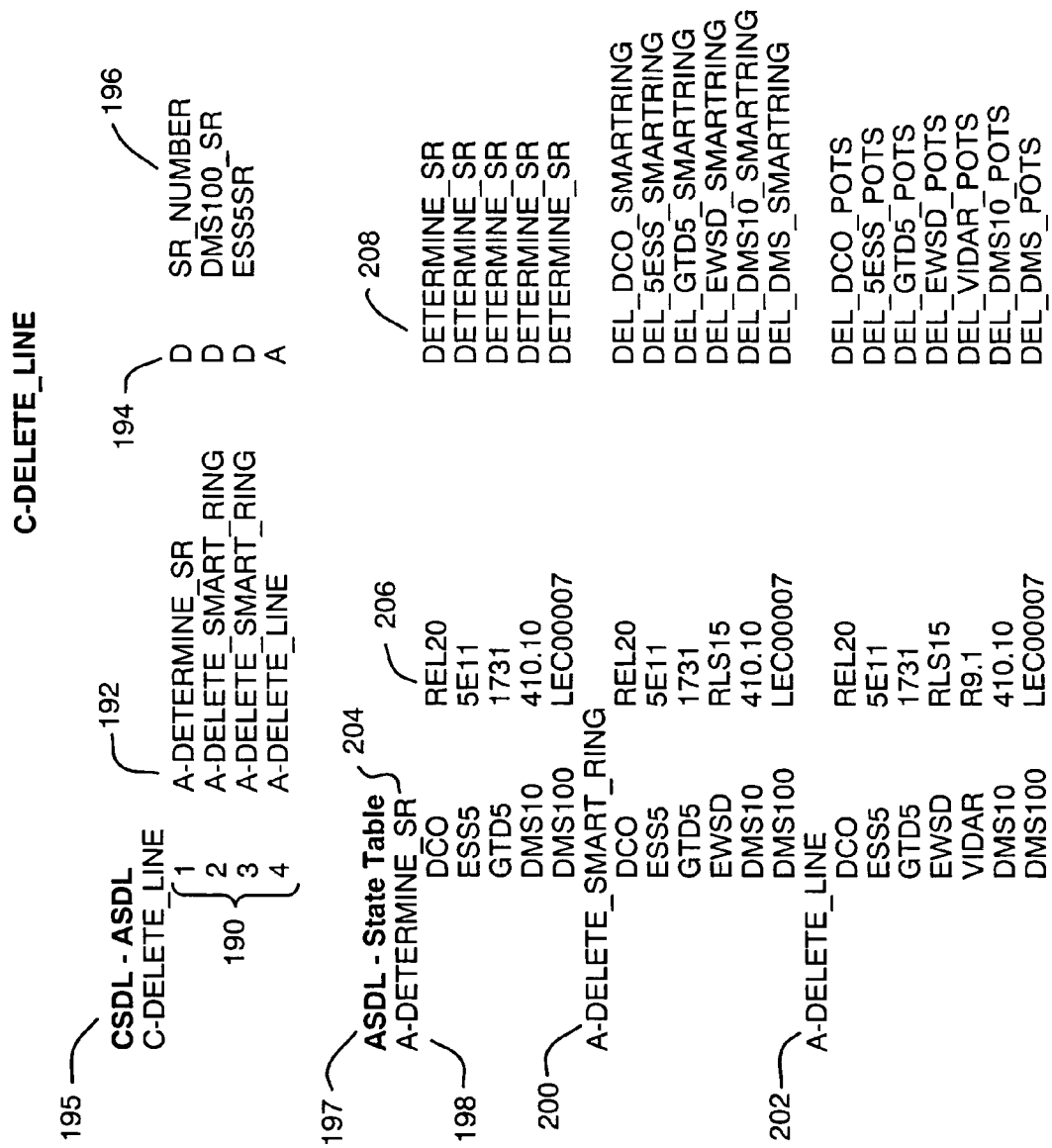
FIG. 12 is an example of an embodiment of data identifying service types, command types and associated programs.

Referring now to FIG. 12, shown is an example of an embodiment of the various tables associated with the CSDL C-DELETE_LINE as shown in FIG. 10. Referring now to FIG. 12, associated with the CSDL or service order type C-DELETE_LINE are four ASDLs or commands 190. Generally, this CSDL deletes a working service. The four ASDLs associated with the CSDL C-DELETE_LINE are each associated with a particular command that must be executed by the switch of the particular subscriber to complete the service order.

It should generally be noted that the format of the information included in FIG. 12 is in accordance with the particular specifications of the ASAP™ application as used in this particular embodiment. For each CSDL specified herein, there are three items associated with each ASDL included in the group 190. Column 192, specifies the name of the ASDL. Column 194 contains a single character boolean which is a test performed to determine whether or not the particular ASDL is executed. Column 196 indicates a parameter used in conjunction with the boolean in column 194 to determine if a particular ASDL specified in column 192 is executed. This will be described in more detail in the paragraphs that follow.

Generally, the boolean tests and ASDLs are executed in a linear fashion sequentially from the top to the bottom. In this particular embodiment, the boolean conditions and ASDLs from 194 as included in group 190 will be executed in accordance with the CSDL C-DELETE_LINE. The first ASDL, A-DETERMINE_SR, is executed if a smart ring number (SR_NUMBER) is present (defined as indicated by the "D" boolean condition) on the work order. A-DETERMINE_SR determines the switch type. The task coordinator determines the one or more ASDLs for a given CSDL by examining the values in column 194 and 196.

Referring to FIG. 12, the task coordinator uses tables stored in the database to determine the ASDLs included in area 190 for the CSDL c-delete line. Accordingly the task coordinator determines if the SR_NUMBER 196 is defined as set forth by line one of FIG. 12. If the boolean condition indicated by column 194 evaluates to true such that SR number, which stands for smart ring number is defined in the work order data structure, the task coordinator may send a message to the designated NEP process with the appropriate information indicating that the ASDL determine_SR is to be executed.

Control is passed to the NEP process which uses information in the ASDL table 197. The ASDL table 197 includes three pieces of information for each ASDL. In this particular embodiment, the ASDL state table includes an entry for each ASDL as identified in the group 190. For example, the A-DETERMINE_SR ASDL as identified in column 192 has a corresponding entry 198 in the ASDL state table 197. Similarly, A-DELETE_SMART_RING as included in group 190 of the CSDL ASDL table 195 includes an entry 200 in the ASDL state table 197. Associated with each ASDL entry and ASDL state table are 3 columns of information. The first column 204 indicates the switch type. The second column 206 indicates the software level of that particular switch type and the third column 208 indicates the program to be executed. In this particular example, for the ASDL A-DETERMINE_SR for the switch type "DCO" and software level being "REL20", the program determine_SR is executed. It should be noted in this particular embodiment that the determine_SR program as indicated in column 208 is executed for each switch type and is independent of switch type. Thus, in this example, the same program is mapped to the ASDL five times for each of five different switch types. This may be contrasted to the next ASDL in FIG. 12 where a different program is mapped to an ASDL for each switch type. Upon the NEP process initiating execution of a program, a status is returned to the NEP process as previously described and control returns to the task coordinator with the status reported. The task coordinator proceeds with executing the subsequent ASDLs in accordance with the defined boolean condition and parameter as indicated by columns 194 and 196 for each of the subsequent ASDLs.

Referring now to FIG. 13, shown is an example of an embodiment of the determine_SR program as indicated in column 208 of FIG. 12. Generally, the determine_SR program prepares data for determining if smart ring is present. It sets a particular parameter which causes subsequent ASDLs to be executed in accordance with certain parameters and their values. Generally, the logic performed within the program determine_SR is if the switch type is a DMS-100 switch, the DMS-100_SR parameter is set which causes the second ASDL as shown in FIG. 12 to be executed. Similarly, if the switch is a 5ESS switch, another parameter is set which causes the third ASDL to be executed. For other switch types in this particular embodiment of the determine_SR program it is not necessary to delete the smart ring number explicitly.

Figure 14:
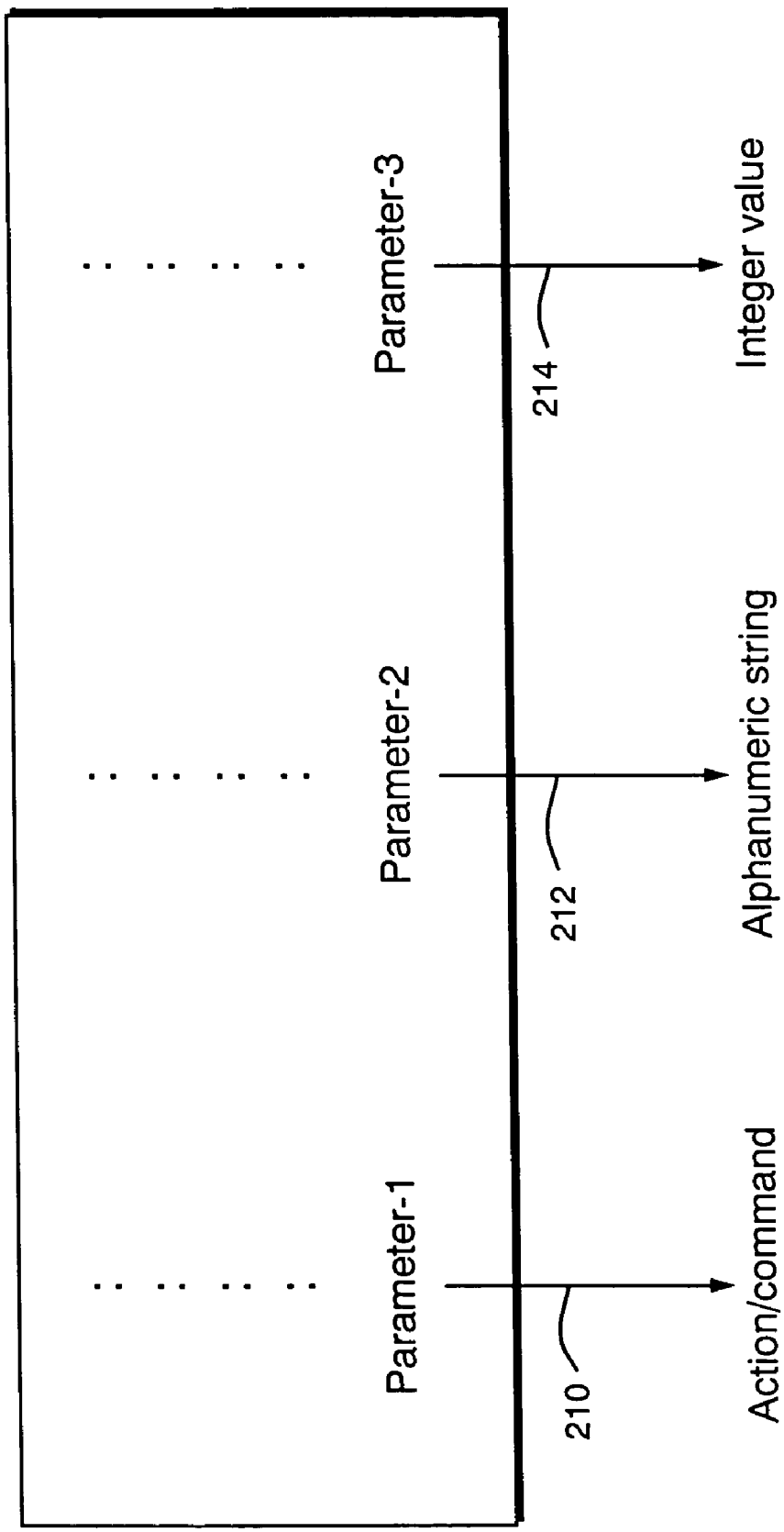
FIG. 14 is an example of an embodiment of a generalized record or line of program of FIG. 13.

Referring now to FIG. 14, shown is an example of the generalization of a format for a record as may be included in a program such as determine_SR FIG. 13. Generally, a record or a command line included in one of the programs includes a format of 3 fields or three parameters. The first field 210 identifies a specific action or command. Referring back to FIG. 13, an example of an action or command is IF_THEN. The second parameter or field 212 is an alphanumeric string. The actual use of the alphanumeric string generally depends on the type of action command in the field 210. For example, if the action or command is IF THEN the alphanumeric string represents a particular test to be performed in terms of boolean logic. The third parameter 214 is an integer value. Similar to the use of the second parameter 212, the integer value 214 and its use are also determined in accordance with the various action or command in field 210.

Referring now to FIG. 15, shown is an example of an embodiment of a program to initialize a single line service. In this particular embodiment, the program of FIG. 15 corresponds to a program associated with the CSDL as indicated in FIG. 11, element 185 C-INIT_NON_HUNT_LINE to initialize a single line service. This, for example, may be used to initialize a non-hunt line, such as a user or subscriber telephone service to a residence. As indicated in the comment at line 220, this program is associated with an ASDL that has been determined in accordance with a Vidar switch type.

Referring back to FIG. 14, note that each of the lines of the program of FIG. 15 conform to the format generally described in accordance with FIG. 14, and also as generally followed by A-DETERMINE_SR program in FIG. 13. In the next few paragraphs that follow, the logic of the program in FIG. 15 will generally be described.

At 222, a call is made to a library function to reformat the line equipment identifier with a specific switch format. In this particular embodiment for this call, it should be noted that "LIB_UTIL" indicates that a general routine exists in this library and is executed for all switch types. This is an indication of how code may also be reused for each particular switch by making a call to a routine. Other routines may be specific to switch types as will be described in paragraphs that follow.

At line 224, the call is made to get a service name. Generally, the classification and representation of the service name is a key component of the data scheme of this system and how the services are organized. Generally, a service name is a codification of a combination of service features that represent a service. As previously described, service features are those features that may be represented by the value parameter pairs. Although the switches included in the PSTN may provide over 400 different features in this particular embodiment, not all of the features may be considered as class-of-service-affecting. Some are known as class features and may be added to a basic service of class-of-service-affecting features requiring the modification of a specific parameter defining the service. One of the reasons for upgrading the provisioning system in this particular embodiment is due to the classification of services in the overall data scheme and design.

The provisioning system 1 in this embodiment generally treats all service features as class-of-service-affecting thus treating all services in a single hierarchy resulting in approximately a million different classes of services each one a different combination of features. The scheme used in producing the service name in provisioning system 2 generally reduces the number to less than 40,000 by considering only subsets of features that directly affect parameters that must be sent to the switch. This is approximately 60 features. These 40,000 combinations of these approximately 60 features may be entered into a data table and define unique identifiers referred to herein as services names. Much of the data used in this embodiment for provisioning varies with the service names which are independent of switch type.

It should be noted that orders to initialize or change a service generally require consideration of the features that determine switch parameters. In this embodiment, approximately 60 features are considered when determining generic switch parameters that are generic, or common, to all services of a particular switch type. Generally, a service, as described, is a collection of features to which a customer subscribes. Each switch generally requires a subset of features to determine the generic switch parameters. The approximately 60 features may be considered switch-independent. When considered collectively, the 60 features form a switch-independent list. Additionally, when forming a switch command, each of the features should be considered to determine if additional feature-specific text is required to be sent to a specific switch. The 40,000 combinations in this embodiment are stored in the service names table that is described in more detail in conjunction with FIG. 20.

This routine invoked at line 224 uses the feature name table and various values communicated to the program as stored in the service order data structure to determine a service name. The details on how to produce the service name using the feature name table and the service name table will be described in conjunction with other figures. As a result of the call to GET_SERVICE, a primary class of service name is returned. Subsequently, at line 226 a call is made to GET_METRO to read the calling plan table. Generally, the calling plan returned from this routine is a boolean value which indicates whether or not a calling plan exists for the particular subscriber. In this embodiment, it should be noted that calling plan refers to a service wherein a subscriber may pay a higher flat rate for the ability to call outside a local area without paying for each call. At line 228, a call is made with an EXEC_RPC command in this embodiment to execute a stored procedure within the NEP database. This call executes a query against the Vidar switch table, 460 in FIG. 19, described in more detail in following paragraphs.

It should be noted that in this embodiment, the EXEC_RPC is an action or command that executes a stored procedure which generally eliminates the need to hardcode data in programs in order to handle various service and feature combinations. A database is designed and included in this embodiment to support all variations of parameters and switch syntax and the EXEC_RPC is used to access information included in the database. The EXEC_RPC call at 228 formulates the SQL query based on the switch ID (encoded in the CLLI_CODE in FIG. 15, 280) the calling plan, and the service name as returned by the call to GET_SERVICE on line 224.

The code executed at block 230 performs a test to determine whether or not the primary class code has been found. The block of code at line 232 perform concatenation commands to form the switch command and various parameters for the Vidar switch type. In this particular embodiment the switch command being formed is stored in and referred to as the % CMD variable. Similarly, the code indicated by block 234 in FIG. 15 combines any features and particular values in the commands for the switch. At line 236, the command % CMD is sent to the front-end server 24 to be executed by the particular switch. At line 238, the send key command is equivalent to pressing an "enter" key, or equivalent, with the value of one indicating to actually enter the command on the switch. In this embodiment, the value of 1 indicates that the NEP is to pause one second after sending the command before proceeding to the next instruction. This is because the switch is much slower that the NEP and will not be able to process the command in less than a second. At line 240, the chain command chains to a program called VIDAR_CHECK. In this particular embodiment, the CHAIN command at line 240 performs a context switch to a process called VIDAR_CHECK to await a switch response. Additionally, the process may include error handling to be performed if there is an error during command execution as performed by a switch.

Figure 16:
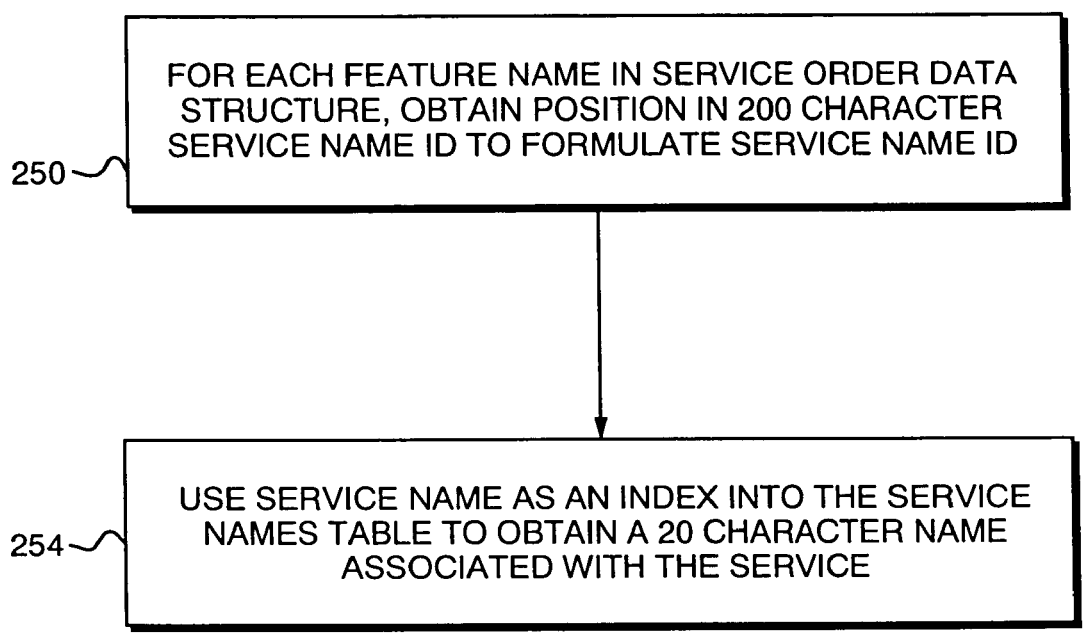
FIG. 16 is an example of an embodiment of a flow chart of method steps for determining a service name.
Figure 17B:
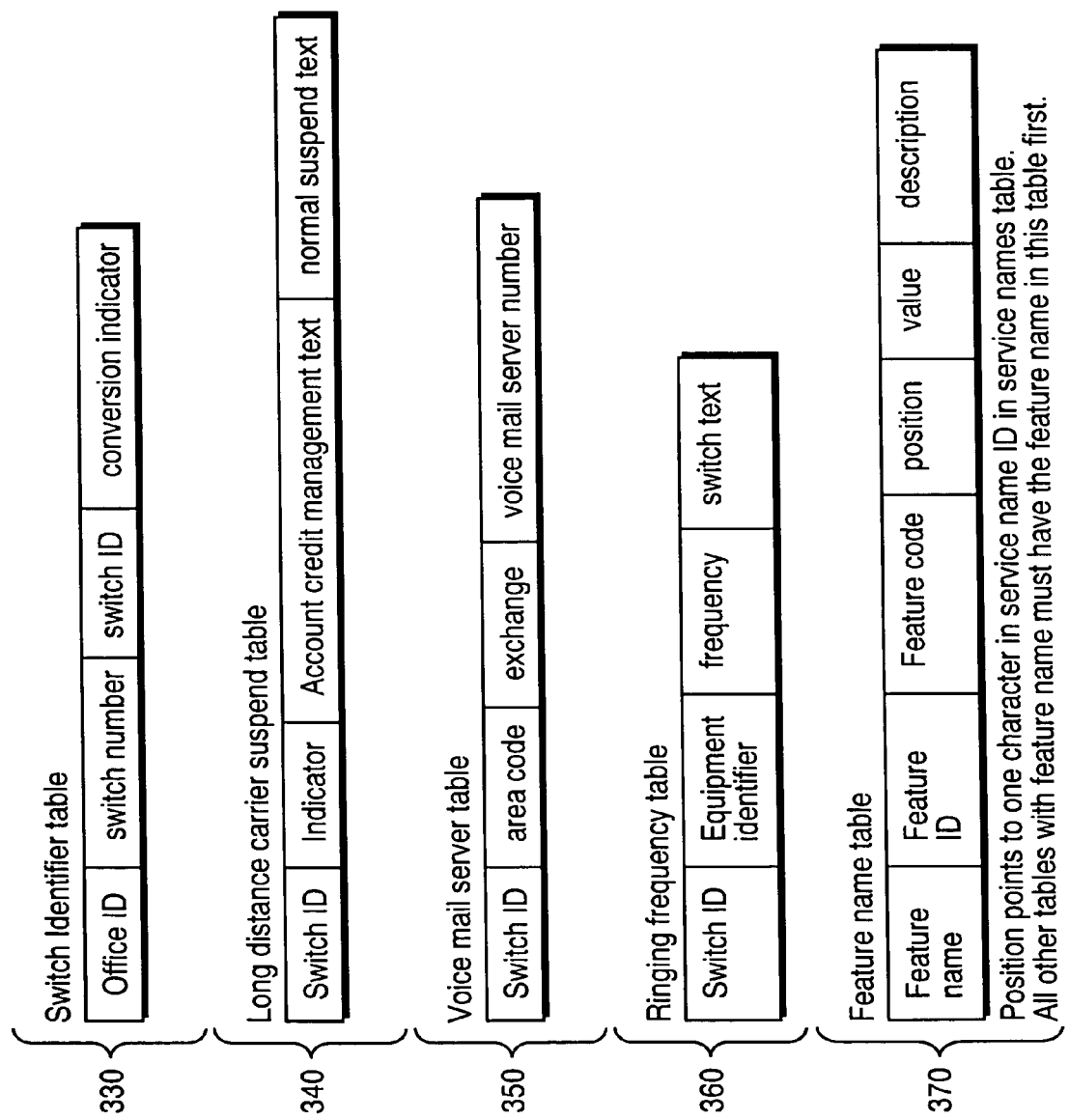
FIGS. 17 through 20 are examples of embodiments of tables defining a data schema used in generating commands in the system of FIG. 1.
Figure 18B:
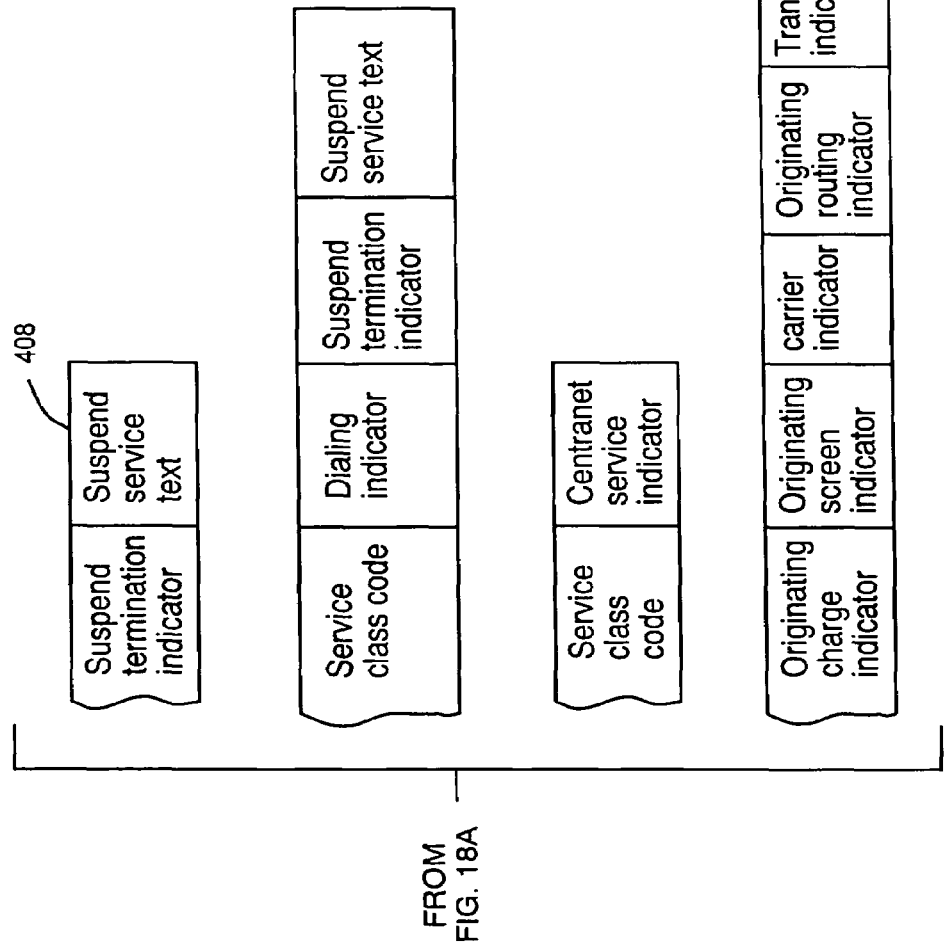

Referring now to FIG. 16, shown is a flowchart that includes method steps of an embodiment for the routine GET SERVICE as included in FIG. 15 at line 224. Generally, the method uses the feature name table to obtain an index and a 200 character service name identifier. Each particular feature and associated value as included in the service order data structure are associated with a particular position in the 200 character long service name identifier. For example, if feature X is defined and has a value, it accordingly has an associated character position in the 200 character long service name identifier. The value of the character of the service name identifier may be determined in accordance with the existence or nonexistence of a feature as well as the value associated with that feature. This mapping is indicated in the feature name table, as will be described in conjunction with FIG. 17-20.

At step 250, a lookup is performed using the feature name table for each feature name in the service order data structure. A position in the 200 character long service name identifier field the value for that particular position in the feature is determined in accordance with the feature name table that is described in other paragraphs in conjunction with FIG. 17. At step 254, the service name formulated by performing a lookup in the feature name table for each of the values uses of an index into service name table to obtain a 20 character name associated with the service. Generally, the 60 or so features used in conjunction with this service names table affect the generic or non-feature specific switch parameters, such as the primary class code and others.

Generally, this technique is applied to isolate and consolidate switch dependency. For example, those features associated with a particular switch may be conceptualized and condensed into a single table as will be described in conjunction with other data structures and tables. However, in this embodiment, the switch dependency is consolidated into the lower level tables of the hierarchy.

In this particular embodiment, service is provided to phone subscribers with more than 400 features. There exists specific switch parameters for all the different switch models and variations as well as for a specific feature associated with each of these switches. Of these over 400 features in this particular embodiment, there are approximately 60 that effect the service name. These features may be subsetted and isolated.

In this embodiment, the service name is used in performing the SQL query on the switch database. Use of the 60 or so features reduces the number of records in the database. Alternatively, to include a database based on all features, such as 400 or so, causes many additional records to be included in the database.

Referring back to FIG. 15, the call to EXEC_RPC at line 228 is accessing data included in a table that is switch dependent. The three parameters passed in the call are: 280 corresponding to the switch identifier (referred to as CLLI_CODE in the example), 284 corresponding to the calling plan, and 286 corresponding to the service name. In combination, these three parameters serve as a key indexing into the table to output a service class code which, in this example, is included in the switch command as detailed in code block 232. It should be noted that the detail of the Vidar switch table, along with other switch tables for other switches, is described in conjunction with other figures in paragraphs that follow.

Generally, the EXEC_RPC command may be used to index into the various tables in accordance with switch type to retrieve information that is used in formulating a command for the particular switch.

Referring now to FIGS. 17 through 20, shown are the various tables used are the different components included in the provisioning system 22 of FIG. 1. Generally, these tables define a data schema used in formulating switch commands for use in the system of FIG. 1. It should be noted that other tables than those included in FIGS. 17-20 may also be used, but these are of particular importance in formulating the switch commands in this embodiment.

The office description table 300 includes a switch ID and a corresponding description. The switch ID is the key used in this table to obtain a description of a switch. Generally the switch description table is not used in this embodiment to process service orders, but rather may be used, for example, by a user or administrator in displaying information for viewing regarding a particular switch identifier.

The master switch table 320 may be read by the SRP and the programs using the switch ID as the key to obtain data to be included in a service order as stored in the service order database. In this particular embodiment, the SRP retrieves, for a given switch identifier (switch ID), the time zone and group ID information and includes this in the data structure stored in the service order database. Fields included contain data about the specific switches.

The switch identifier table 330 uses an office and switch number as may be maintained from the input data structure 18 to obtain as output the various switch identifier. The SRP reads from this table to obtain a switch identifier (switch ID) and stores it in the data structure included in the service order database 54.

The long distance carrier suspend table 340 may be read by the programs as executed in accordance with the particular ASDLs. The switch identifier and indicator may be used as an index into the long distance carrier suspend table 340 to return information regarding account credit management text or normal suspend text. The text returned as an output of accessing this table is actually included in the command to a switch. The long distance carrier suspend table may include information for a switch command, for example, if someone hasn't paid their long distance bill and designates what type of action to take with regard to long distance service for the particular telephone subscriber.

The voice mail server table 350 uses as an index the switch ID, the area code and the exchange to return the voice mail server number for a particular subscriber. The SRP and the program may read the voice mail server table.

The ringing frequency table 360 includes commands to a switch that determines the electrical frequency for making a ringing sound on a subscriber's phone. The key into the ringing frequency table is the switch ID, an equipment identifier, and a frequency which returns text in the switch text field that the program might be included in the actual command sent to the switch.

The feature name table 370 may be read by the SRP in the program. As previously described, the SRP may read this to obtain information regarding the feature value pairs. Additionally, one of the executed programs in formulating a switch command may access this in conjunction with the service name formulation.

The feature table 380 may be read by a program to determine what common information to be concatenated or included in a switch command. The switch ID and feature name are used as indices to return "text to add feature", "text to remove feature", and "feature type code" field data as included in the feature table 380. Generally, the field "text to add feature", and "text to remove feature" are included in accordance with whether the command to be formed is to remove or add a feature. The feature type code contains additional information for each feature.

In this embodiment, the feature type code facilitates switch support where different features require different commands to add the features. "TYPE1", for example, gets one command, and "TYPE 2" get another command. This may be in addition to the text that provisions the feature itself.

The default feature table 390 is read by the SRP to include default feature information, for example, for a particular geographic area. Used as an index into the default feature table is the switch ID and the feature name. An output of the table is the service type which specified the default. For example, whether a particular geographic area receives *66 call blocking information may be specified in the default feature table 390.

Tables 400, 410, 420, 430 and 440 are used in the embodiment only by programs in formulating switch commands. In particular, this is due to the fact the switch dependencies have been embedded in the classification of the ASDLs as associated with various programs that formulate switch specific commands. The 5ESS switch table 400 may be used to provide the switch parameters to initialize or modify a service. It may also be used to obtain the suspend service text information which is actually included in the command to the 5ESS switch. The remaining fields in the table may be used as indices or keys to return the suspend service text 408.

The 5ESS switch by telephone number table 410 supports one switch in which the switch parameters depend not only on the key fields defined for 400, but also on the subscriber's telephone number. The 5ESS switch by telephone number table 410 takes as a key those fields indicated by 412, and returns the remaining fields.

The DMS 100 switch table 420 uses as an index or key those fields indicated by 422. The remaining fields of table 420 are returned as an output. A portion of these output fields, all except the Centranet service indicator field, may be included in the commands formed for the DMS 100 switch.

The GTD5 switch table 430 uses as a key field those indicated by 432, and returns the remaining information some of which may be used in sending commands to the switch. It should be noted that all of the non-key data included in 430 may be included in a command, such as an initialize command. Other types of commands, such as a modify or restore command type, may not include all the non-key data in forming a switch command.

The DCO switch table 440 uses as a key the fields indicated by 442 and returns the service class code. The service class code may be included as part of a switch command.

Figure 19B:
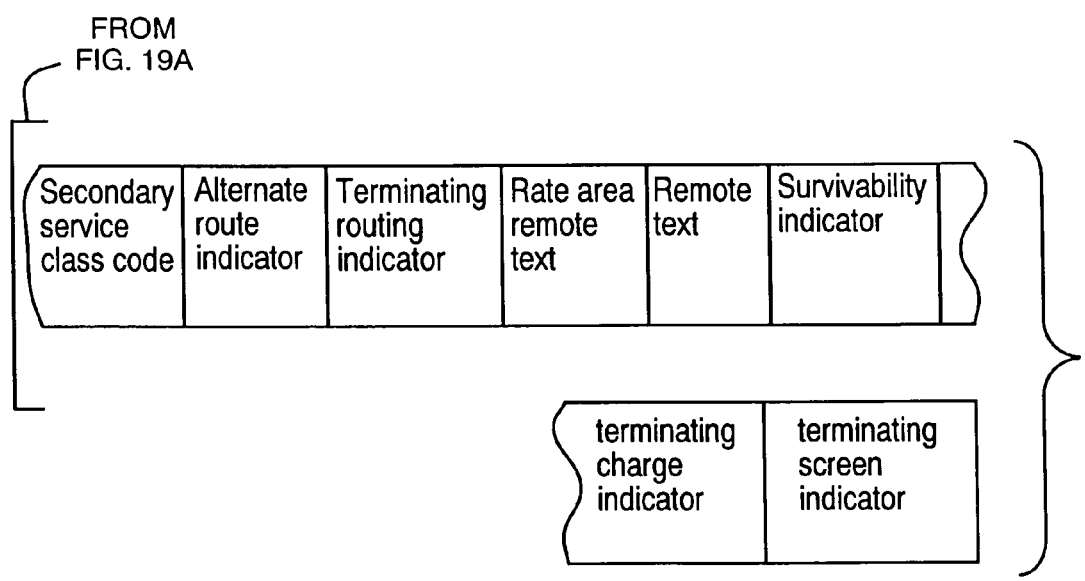

Referring now to FIG. 19, the DMS 10switch table 450 is used to formulate commands for the DMS 10 switch. The key is used as an index into the table as indicated by the field 452 and returns the service class code. It should be noted that all of the tables indicated in FIG. 19 are read only by the programs to determine switch information and particular text that may be included in commands for the various switch types in this particular embodiment.

The Vidar switch table 460 uses as an index or key those fields indicated by the key 462 and similarly returns the service class code particular to the Vidar switch. Table 470 similarly uses the key as indicated by filed 472 for the EWSD switch and returns information that may also be included in commands for the EWSD switch.

The calling plan table 480 is used to obtain calling plan information and is used also by the program in forming switch commands. An index into this calling plan table is with switch ID and exchange code. If a value exists in a calling plan table, a boolean value is returned of true indicating that the calling plan for this particular telephone subscriber exists.

The DMS 100 long distance carrier code table 490 uses a key which is indicated in field 492, and returns information, such as a translated long distance carrier code, which may be used in formulating switch command text.

The GTD5 hunt group table 500 uses as a key that which is indicated by field 502. Every field not included in the key field may be included in a switch command if it has a value.

The DMS 10 equipment prefix table 510 uses as a key that which is indicated by field 512 for the DMS 10 switch and returns a translated equipment prefix field which is used for formulating the switch command. This table may be used by a program in forming a switch command.

The DMS 10 error code table 520 uses as a key that which is indicated by field 514 and returns various error information.

Figure 20B:
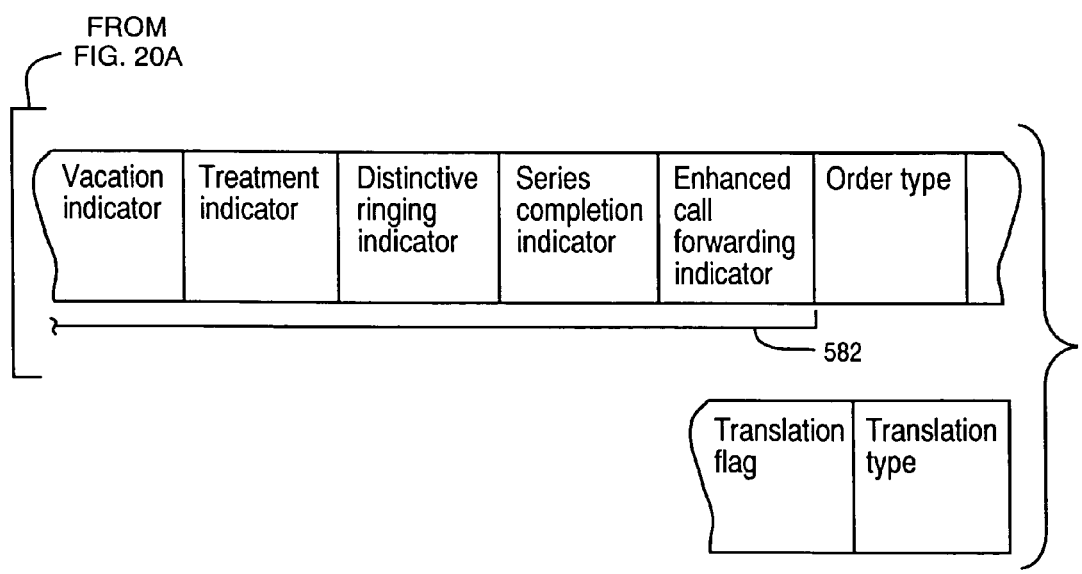

Referring to FIG. 20, the equipment translation table 530 may be used by the SRP to determine a particular user port in the specific switch identifier. It uses as an index those fields indicated by key 532 and returns a translated equipment identifier.

The GTD 5 traffic source table 540 is read by the program to generate report or statistics for a particular service. The key field 542 used as an index into this table. This table may be used, for example, to send a parameter to a switch to allow report generation from a switch database regarding switch traffic for routing, calls, trunk lines, and the like. The parameter may be determined in accordance with type of service and line equipment.

The GTD 5 pay-per-use feature table 550 is read by the program for a GTD 5 switch using the key as indicated as field 552. The remaining fields are returned in accordance with values specified for the key 552 and may be used in formulating commands sent to the GTD 5 switch.

The equipment identifier format table 560 is read by a program for a particular switch type and software version used as an index for key field 562 and an equipment identifier mask is returned. For example, in sending a command to a particular switch, this edit format as described by the equipment mask identifier may be used. Generally, this mask describes particular fields and values to be placed in them much like a date formatting structure for a sequence of six digits to represent a month, day and year.

The service names table 570 is read by the program which, as previously described, may be used to determine a service name that is used as an index into many of the switching tables also previously described. Recall that the service name identifier 572 is used as a key into this table. In this embodiment it is a 200-character field with particular positional encoded data in accordance with features and returns a service name that may be from 1 to 20 characters in length. Other embodiments may have different character lengths.

The order type table 580 is read by the SRP and stored in the data base to determine the CSDL or service order type. The key field 582 indicates those fields which are used to determine the particular order type.

It should be noted in this particular embodiment that there are approximately 300 programs to implement over a million different types of feature commands and switches in combination.

In this particular embodiment, it should be noted that a restriction is encountered when referring to the mechanism of using parameters as may be seen in conjunction with FIG. 12. Recall that the mechanism used is the dynamic setting of a parameter in conjunction with the processing described with FIG. 12. However, in this particular embodiment, only a single parameter may be used. One problem encountered was this restriction of only being to communicate one piece of information with a single parameter. The problem arose with how to communicate other forms of information which may be needed to be communicated for the various commands.

One technique used to work around this restriction relates to dynamically modifying a data structure stored in the service order database 54 as used by the task coordinator in the NEP process. Generally, the data structure as used by the various processes may be dynamically expanded to include additional fields to communicate the information as needed. In other words, a first portion of the data structure is used to store the service order information as may be included in the service order database 54 and used in performing the processing thereof. Following this first portion of information is a second portion which is used as a parameter passing mechanism to communicate information between the various programs in the provisioning system 22.

Figure 21:
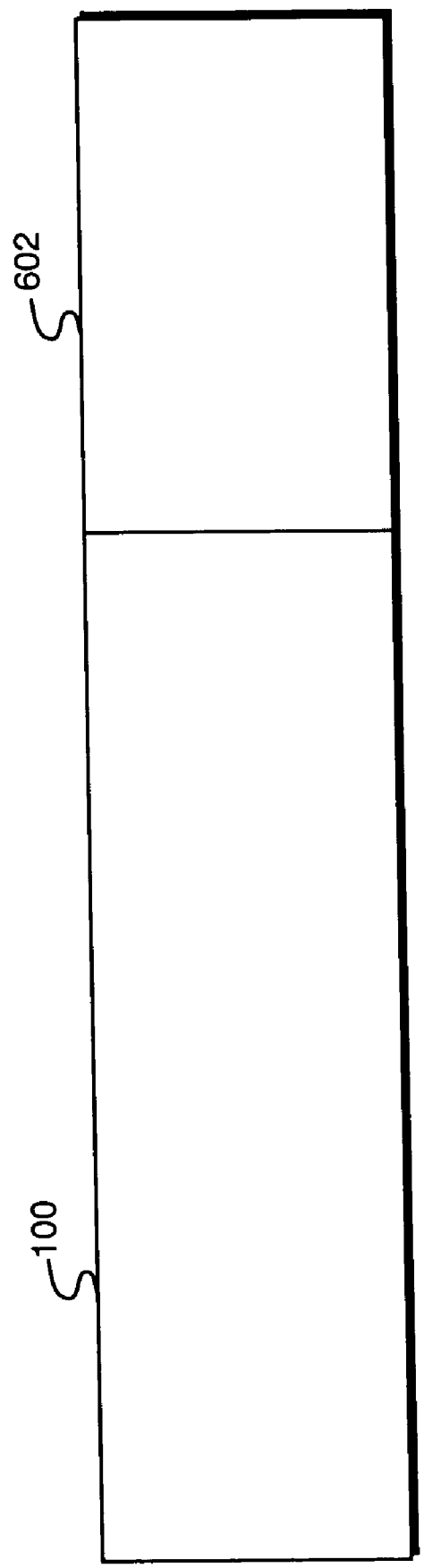
FIG. 21 is an example of an embodiment of a data structure that includes a portion used for communicating data in the system of FIG. 1.

Referring now to FIG. 21, shown is an embodiment of a data structure with reference to the previously described data structure 100 which is used within the provisioning system 22 as initially produced and filled in by the SRP and stored in the service order database 54. It should be noted that the data structure 660 contains two portions, the original data structure 100 as created by the SRP and used by the task coordinator. Additionally, a second portion 602 may be added as a variable length portion in accordance with the mirror of parameters and values that need to be communicated to different programs in accordance with the different CSDLs and ASDLs. Generally, the technique is to create a new field in the data structure as needed with the appropriate values to communicate information dynamically. The self-modifying data structure format involves using the record for each data structure as a common area for data communication. This record may be written and read as needed from the various databases using, for example, database commands previously used to access other data. The knowledge of how to access the data and what is included is embedded within the programs. It should be noted that the common area or the additional segment does not need to be restricted to being appended to the existing data structure 100. Rather, it may be included in a beginning or other middle portion of the data structure with knowledge of this location included in the programs that access the data structure and the additional parameters specified in this dynamic communication area.

The technique previously described minimizes the impact of changes to the code in accordance with the various number of switches. Additionally, multiple levels or hierarchy promote code reuse and modular code design as well as minimizing the impact on the code due to changes in switches. This multiple level hierarchy as previously described is used as a technique for determining what information from tables is needed to formulate commands for the various switches that may be included in the public switch telephone network. Additionally, in this particular embodiment, a self-modifying data structure is used as a common area for communication to communicate pieces of information and the values for them between various programs that actually formulate the commands sent to the switches.

It should be noted that any particularities in this system suggest a number of processes with a specific number of fields or tables or particulars to this embodiment. However, this should not be construed as a limitation to his particular invention as one skilled in the art may readily extend the principles of the invention included herein to other embodiments in other systems.

The use of a system commercially available such as the ASAP™ application by Architel™ may have analogous counterparts that provide the same function in other embodiments of the invention in accordance with a particular implementation. It should also be noted in this particular embodiment that the database, such as the service order data base and the NEP data base of the provisioning system 22 may be SQL databases or other types of data bases. In this particular embodiment, these data bases are relational data bases that include, for example, approximately 300 short programs as well as the various data tables.

In this particular embodiment, there is a set of programs particular for each switch, as well as a set of generic or common programs that function for all switch types and libraries of functions to provide for reusability of code. This greatly simplifies maintenance of code with regard to any changes being minimized to a particular module for a variety of switches.

In this particular embodiment, there were seven different switch types as well as tens of thousands of different services. Another embodiment may have a different number of switch types as well as a different number of services.

The general database schema and the use of tables with the information provided in the work order and the data structures provide a flexible and efficient mechanism for generating commands in this provisioning system. In this particular embodiment, there are different tables for each switch type as well as some tables that are independent of switch type. The data schema used in this embodiment may be extended to other related fields. Generally, a system that requires generation and delivery of textual commands to a computer based system may be accomplished using the techniques described herein with any extension that are recognizable by those skilled in the art. For example, incorporating the principles of the invention described herein, a system for provisioning commands for an electronic banking transaction may be used.

The foregoing description provides techniques for generating commands, as by the second provisioning system, to replace the first provisioning system as included in the system 10 of FIG. 1. When implementing a new provisioning system, such as provisioning system 2, the commands generated may be similar but not identical to commands generated by its predecessor systems, such as provisioning system 1. It may be desired to test the quality of the commands generated by the second new provisioning system prior that will replace the existing provisioning system such as provisioning system 1 in the system 10 of FIG. 1.

Many switches, as included in the PSTN of FIG. 1, may be configured uniquely and success may be determined by comparing the output of the new system with that of the old system. A command comparison of the two systems for verification should allow for variations in word order and the use of optional phrases, such that a straight forward textual string comparison is not necessarily useful in providing and verifying the commands generated by the second provisioning system.

What will be described in paragraphs that follow is a technique for verifying the commands generated by the second provisioning system in accordance with commands generated by the existing first provisioning system. What is described below is a technique that reviews log files in accordance with commands generated by the first or existing provisioning system, and compares the commands included in the log files with the contents of database tables and program code comprising the new provisioning system, provisioning system 2, insuring that the necessary phrases, and the like exist in the new second provisioning system which generates the commands. Generally, this technique which will be described identifies words and phrases missing from the data sources used in command generation that are included in the second provisioning system. Thus, this indicates commands or options that the new system is not capable of constructing. It is anticipated that missing words in the new system generally result in failed command generation with various options, words or phrases that are missing. This technique therefore may be used to identify data omissions with regard to command generation.

If no such problems are found regarding data omissions from data sources included in the second provisioning system, the second provisioning system may be expected to have the correct data to construct the commands for the particular switches.

Figure 22:
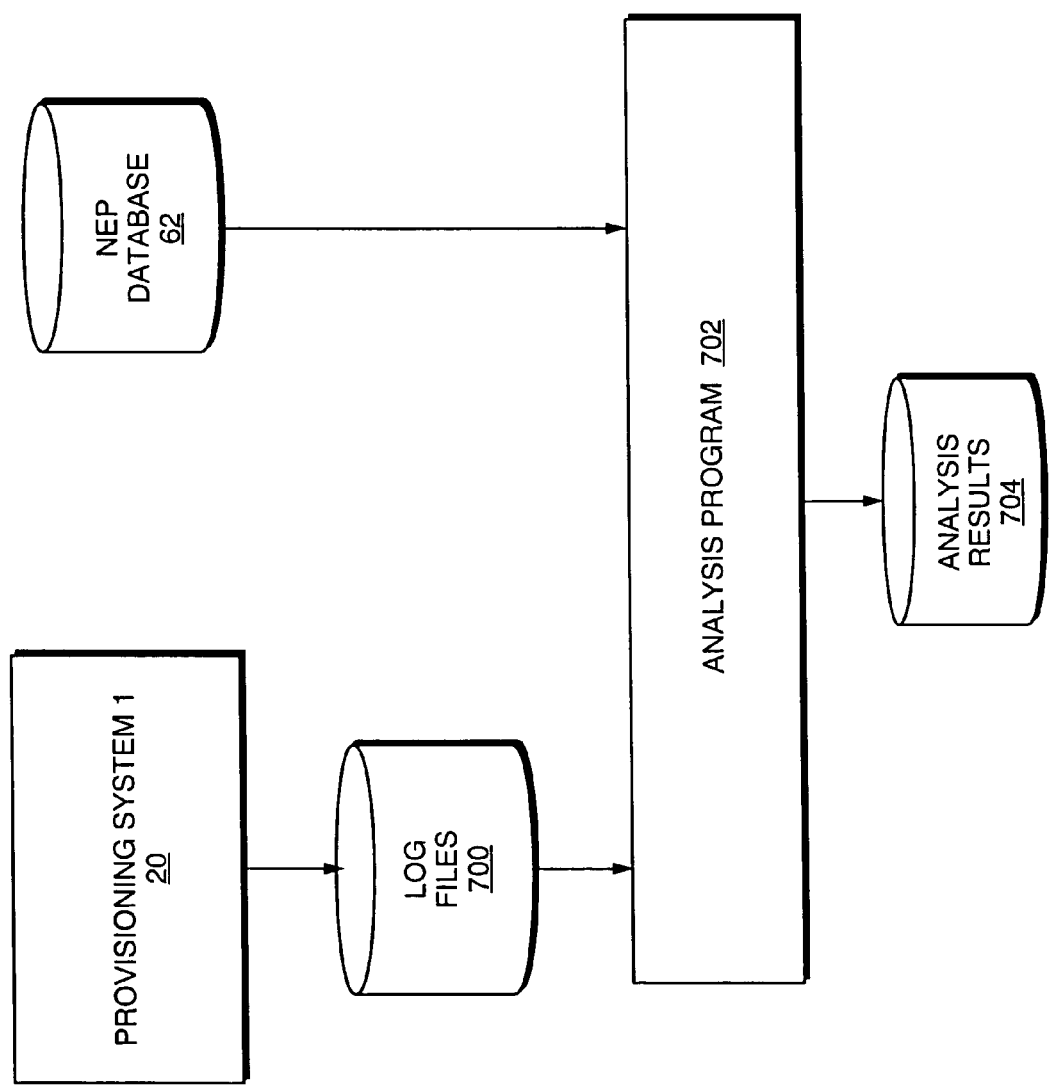
FIG. 22 is an example of an embodiment of a system used to analyze the commands generated by a new second provisioning system in accordance with log files generated by an existing first provisioning system.

Referring now to FIG. 22, shown is an example of an embodiment of the system for analyzing and verifying the commands generated by the second provisioning system in accordance with commands generated by a first existing provisioning system. Included in FIG. 22 is the first or existing provisioning system 20 as previously included in the system 10 of FIG. 1. This existing provisioning system 1 generates one or more log files 700 which includes commands generated by the provisioning system 1 as used for switch commands to the PSTN 26 in a system 10 of FIG. 1. The analysis program 702 takes as input the various log files 700 as well as various data tables and programs from the NEP database 62 used by the second provisioning system in command generation. The analysis program 702 compares the various commands from the log files 700 with commands and options included in the tables of the NEP database 62 to determine if the second provisioning system is capable of correctly generating commands that are currently generated by the first provisioning system. In other words, the analysis program examines those commands actually generated by the first provisioning system. The analysis program subsequently determines which of these commands that are actually generated by the first provisioning system may be generated correctly by the second provisioning system 22 in accordance with tables used by the second provisioning system as stored in the NEP database 62. As a result, the analysis program 702 outputs analysis results 704 indicating, for example, what commands and options may not be correctly generated by the second provisioning system in accordance with commands output by the first provisioning system and data tables actually used in the command generation by the second provisioning system.

It should be noted that in this particular embodiment of FIG. 22, there is an analysis program for each particular switch or hardware type. For example, there is an analysis program for the 5ESS switch type and the DMS10 switch type. Additionally, the log files 700 include commands that are sorted in accordance with switch or hardware type. In other words, the log files 700 includes a file or arrangement of 5ESS switch commands grouped together. Similarly, the DMS10 commands are grouped together. Each of the hardware or switch type commands are read in as input to the switch type specific analysis program 702. In other words, the various commands associated with the 5ESS switch type as stored in the log file 700 are read as input into the analysis program 702 for the 5ESS switch type. Thus, the analysis in this particular embodiment is performed on presorted commands by switch type.

Other embodiments, as known to those skilled in the art, may use different techniques rather than presorting commands in accordance with switch or hardware type. For example, as will be described in paragraphs that follow in conjunction with the method of FIG. 23, an embodiment may choose to do the sorting within the method steps as included in FIG. 23. This is done as an alternative rather than performing the steps of sorting the commands prior to performing the method steps of FIG. 23 as in this embodiment.

It should be noted that the log files 700 may be stored in an existing database format or as a file in a file system in accordance with the particular embodiment and software on a particular system. The log files may be stored on a first provisioning system, on a separate system, or on the same system upon which the analysis program is run. The various hardware and software configurations in terms of which of the components in FIG. 22 were on a particular hardware and software system vary in accordance with each particular embodiment of the invention.

In this particular embodiment, the analysis program 702 is switch type specific due to the fact that in this particular embodiment hard coded portions of programs as included in the NEP database 62 are switch type specific. In other words, the analysis program in performing its analysis reads in various programs which include switch type specific data from the NEP database. In this particular embodiment, the analysis program or programs 702 may be written in the Perl programming language. This may be found on the Internet at the address using URL http:\\\www.perl.com. Generally, Perl runs on a variety of commercially available processors with a variety of commercially available operating systems such as Windows 95™ and HP-UX™ and well as OpenVMS™. It should be noted that other embodiments may implement the analysis program using similar functions in other languages besides Perl. Some of these language processors may be commercially available or free on the Internet, similar to the way Perl is available on the Internet.

Figure 23:
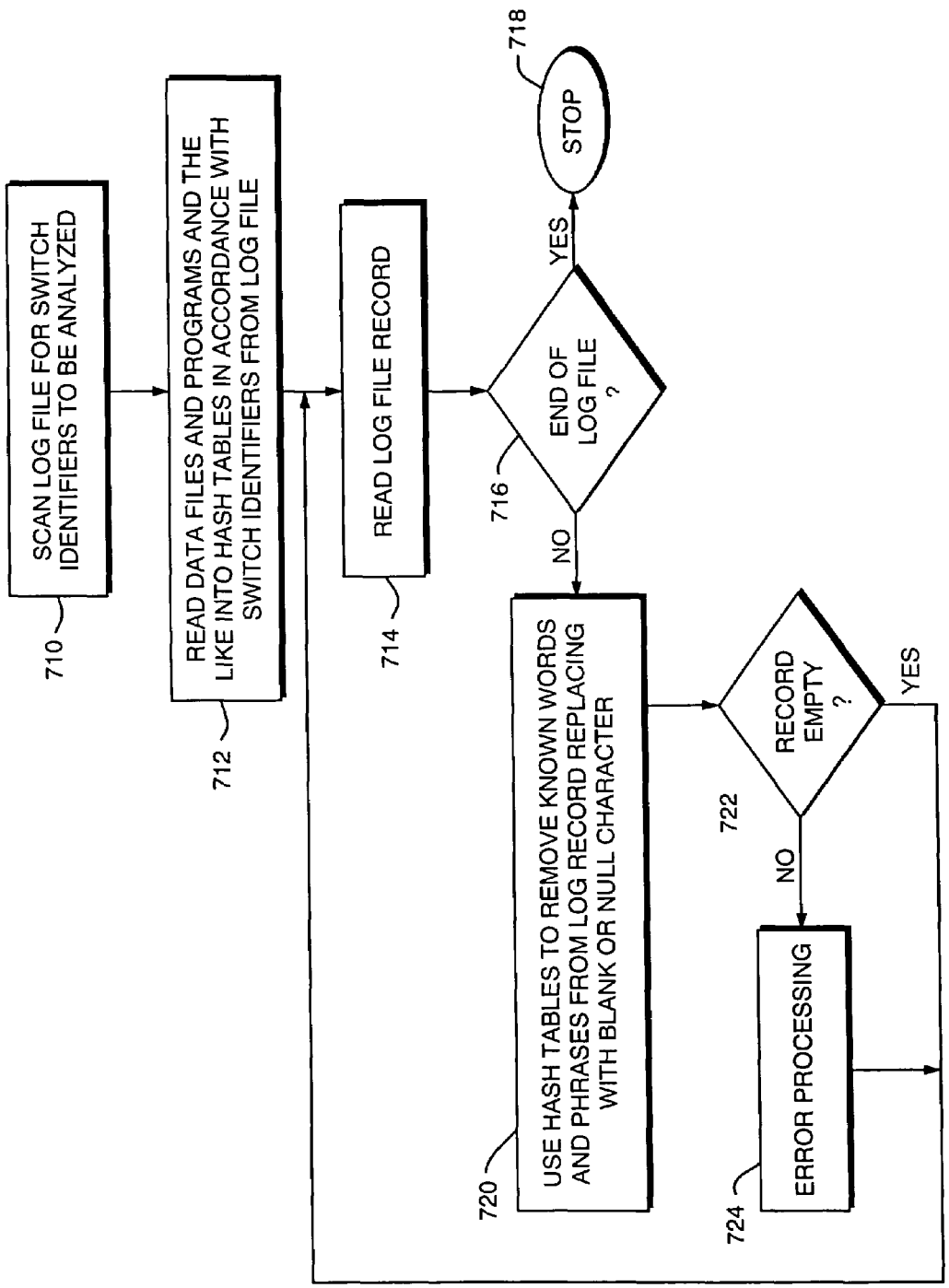
FIG. 23 is a flowchart of an example of an embodiment of a method including steps for analyzing the commands generated by a new provisioning system.

Referring now to FIG. 23, shown is a flowchart of a method on an embodiment for analyzing commands generated by a provisioning system. At step 710, the log file for the particular switch type is scanned, identifying various switch identifiers to be analyzed. At step 710, a list of switch identifiers may be produced, identifying collectively a list of all of the switches identifiers which are of a particular switch type as being analyzed by the analysis program. Recall that a switch identifier identifies a unique physical switch in the network, such as the PSTN 26 of FIG. 1. Various switch identifiers included in the PSTN may be of a particular switch type, such as the 5ESS switch type which is being analyzed by the particular analysis program 702 for the switch type 5ESS. As a result of step 710, a list of all of the switch identifiers included in the log file for that particular switch type is produced.

At step 712, the data files, programs and the like as stored in the NEP database 62 are read in and stored in hash tables in accordance with the switch identifiers from the log file as identified in step 710. In one embodiment, these hash tables are stored in memory for speed in data storage and retrieval. Other embodiments may store a portion of these on disk files as well as in-memory copies.

As a result of step 712, data which is not associated with a switch identifier having commands generated in the log file do not have data read into hash tables and stored by the analysis program. This may be considered as an alternative in one embodiment rather than just reading in all of the commands for all of the switch identifiers from the log file for a particular type. In this embodiment, this results often in a shortened search time due to the fact that less data is stored in the various hash tables for data retrieval and storage. Additionally, this minimizes data storage of the various command options by only storing the data which is necessary for the various switch identifiers actually used identified in step 710.

At step 714, the log file records are accessed from the beginning of the file. A first record from the log file for this particular switch type is read in. At step 716, a test is performed to determine whether this is the last record or the end of the log file. If at step 716, a determination is made that this is the end of the log file, processing stops and control proceeds to step 718. If it has been determined that this is not the end of the log file, control proceeds to step 720 where the hash tables are populated using the data from the NEP database as used in command generation. These hash tables include known words and phrases as may be included in switch commands generated and appearing in the log record. In contrast, words, parameters and the like not included in these hash tables may be considered unknown words or phrases. In this embodiment, for example, the known words and parameters as identified in accordance with hash table contents may be replaced with blanks, commas (","), or null characters. At step 722, a test is performed to see if the record from the log file is now empty. The logic of a test at step 722 is that if all of the words and phrases for a particular command have been removed along with the command, then the record itself should be empty. Thus, at step 722, if the record is empty, all of the commands and various options for that command have been recognized and the provisioning system 2 may generate the command properly using its tables. Control then proceeds to the top of the loop formed by step 714 where another record is read into the log file for continued processing.

At step 722, if the record is not empty, then at least one or more of the phrases and words from a particular record were not recognized or removed in accordance with the tables used at step 720. In other words, the tables read in from the NEP database 62 as used by the new provisioning system to generate commands did not contain all of the options or the command words and phrases as generated by the old or existing system. Thus, it may be concluded that the second provisioning system using these tables would not be able to generate an equivalent command. Thus, control proceeds to step 724 where error processing may be performed. Error processing may include, for example, generating messages about the unidentified words or phrases in a reporting file. Other types of error processing may be performed in accordance with each particular embodiment. Control proceeds to the top of the loop formed by step 714 where a subsequent log file record is read in and processing continues until the entire log file for that particular switch type has been processed.

Figure 24:
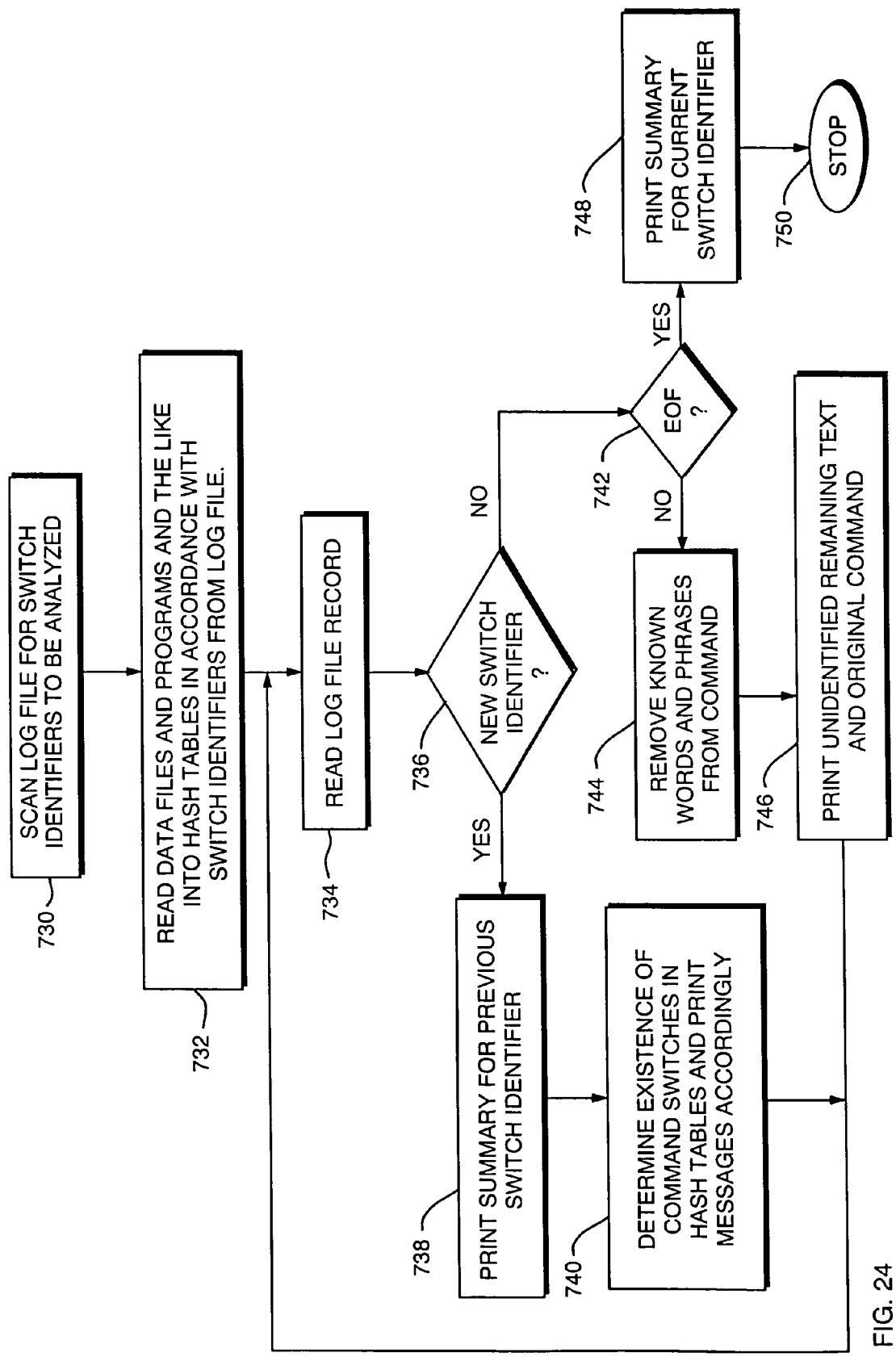
FIG. 24 is a flowchart of an example of an embodiment of method steps of a second method for analyzing commands generated by a provisioning system.

Referring now to FIG. 24, shown is an example of a flowchart of another embodiment while verifying the commands generated by a provisioning system. Generally, the method steps of FIG. 24 are similar to those of FIG. 23 with additional steps regarding what actions are taken when commands are recognized, as well as what information is output, for example, in an analysis report.

At step 730, the log file is scanned for switch identifiers to be analyzed. This step 730 is analogous to step 710 of FIG. 23 in which a list of switch identifiers for this particular switch type is output. At step 732, data files, programs and the like are read into hash tables in accordance with the various switch identifiers from the log file. Step 732 is similar to step 712 of FIG. 23. At step 734, the first record of a log file is read. Step 734 is similar to step 714 of FIG. 23. At step 736, a determination is made as to whether the log file record just read in identifies a new switch identifier. At step 736, if a determination is made that this is a new switch identifier, control proceeds to step 738 where summary information is printed out for a previous switch identifier if there is any.

At step 740, the existence of command switches in hash tables is determined for the new switch identifier just read in in step 734. Generally, step 738 prints out summary information for the previous switch identifier, if there has been a previous switch identifier. At step 740, various data tables, programs and like as read in from the NEP database 62 and stored in the hash tables in step 732 are scanned to determine if in this particular new switch identifier there is information stored in the various tables. For example, for a particular switch identifier there may be no existing entry in a particular data table. Following step 740, control proceeds to the top of the loop at step 734 where another log file record is input.

In this particular example, it is assumed that there is a record deliminator when a new switch identifier and its commands are encountered. Thus, the first time a new switch identifier is encountered, there is a separate record identifying this changeover to additional commands for this particular new switch identifier.

If at step 736, a determination has been made that the switch identifier for a particular record read is not a new switch identifier, control proceeds to step 742 where a test is performed to determine if we are at the end of the file. If at step 742 it is determined that we are at the end of the log file, control proceeds to step 748 where summary information is printed for the current switch identifier. Subsequently, processing stops at step 750.

At step 742, if a determination is made that it is not the end of the file, control proceeds to step 744 where known words and phrases from the command are removed in accordance with the hash tables as stored at step 732. At step 746, any unidentified remaining text is output along with the original command for the purposes of error processing in step 746. Subsequently, control proceeds to step 734 where processing continues with the next file record.

Referring now to FIGS. 25 through 28, shown is an example of the output as produced in the analysis results 704 FIG. 22 in one embodiment. It should be noted that what is described and shown in these figures and in paragraphs that follow is an example of an embodiment of the output of the analysis that may be performed by the analysis program 702. Other embodiments may employ different analysis results 704 in accordance with the principles of the invention described herein.

In FIG. 25, the report identifies a particular switch identifier 760 as LNLKFLXA99H. At lines 762, information regarding the existence of information in tables regarding this particular switch identifier is output. Similarly, lines 764, 766, 768, and 770 are results of performing, for example, the processing of step 740 of FIG. 24 where the existence of the various command switches and the hash tables for the switch identifier is determined.

In this particular analysis report embodiment, an indication is output as to whether the various tables include entries for this particular switch identifier. Additionally, actual information as stored in the table for this particular switch identifier is output, for example, at lines 764.

Beginning with output at line 776, the various unidentified text, words and phrases are output. For example, 772 identifies a line of text that has not been identified for a corresponding command line 776. This is indicated by having the analysis program for the switch type 702 output the unidentified text 772, followed by the original command 776 which includes the unidentified portion within that command 774. Similarly, the original command as identified by 780 is output. The unidentified text portion 778 is identified within the command 780 in field 782.

Referring now to FIG. 26, after the switch identifier specific information is output, summary information may be output regarding the current switch identifier or identifiers, for example, the lines identified by 786. Information is output regarding switch types as identified by 784. In 786, the unidentified words for the records associated with identifiers 784 are output.

Referring now to FIG. 27, additional summary information regarding the two switches, switch identifiers 784, are output beginning at line 788. For example, beginning at line 788, switch features table for the two switch identifiers 784 are output.

It should be noted that some of the files and tables read in from the NEP database 62 as used in the processing step 712 of FIG. 23 and step 732 of FIG. 24, for example, include switch independent, as well as switch dependent information. In other words, as previously described, some of the tables contain switch independent information and other tables contain switch dependent information in accordance with switch type. For this reason, in this particular embodiment some of the programs, for example, are switch dependent. Thus, it may be a design decision to perform the analysis based on hardware switch type. Other variations of this embodiment are possible in accordance with each particular embodiment's specifications incorporating the principles of the invention as described herein.

Generally, what has been described is a method for verifying the commands generated by a system in accordance with a log file of an existing systems command. A log file 700 of FIG. 22 includes successful switch commands which are needed to compare against the phrases available and generated by a new provisioning system, such as provisioning system 2. Various files as included in the NEP database 62 containing words and phrases stored in database tables and embedded or hard coded into programs themselves are used in this second provisioning system. The method described in conjunction with FIGS. 23 and 24 include reading the switch command work file to identify switches to be reviewed. Subsequently, data is stored in the NEP database and related program files are loaded into hash tables with various switch identifiers having commands generated by the first provisioning system. Finally, the log file is again reviewed one record or command at a time. For each command, generally the methods and techniques previously described examine words and phrases and compare those against the available database and program words and phrases. If a match is found, it is removed from the command. This continues until either there is nothing left to remove from the command or no other words or phrases are left to be compared. If there is nothing left to remove, this is a successful test of the system. The new provisioning system may be concluded to contain sufficient words and phrases as stored in the tables in the database to construct the command. Any words or phrases left over are printed, as indicated by the second or alternate method of FIG. 24, followed by the original command for review by a person. Generally, these items which are printed as left over need to be added to the system to enable a second or new provisioning system to create the command with the various options which are missing. Additionally, the second method of the steps of FIG. 24 output additional information for review by a person, for example, such as outputting the contents of the various databases for review by an engineer, and a summary of the words or phrases missing from the data tables for a particular switch identifier.

Generally, the testing techniques described herein for verifying the commands generated by the second provisioning system may be used to verify other types of command or automatic generation system. Generally, the techniques do not focus on coverage of commands that may be generated by the first or existing provisioning system. Rather, the focus is on the actual set of commands generated by the first provisioning system. This approach focuses on actual rather than potential command generation. One advantage of the foregoing technique, for example, is that commands which may be outdated or old in an existing system which are no longer used or generated are not considered in the new provisioning system. For example, if code exists within the first provisioning system to generate outdated commands, and no one ever uses those code segments from the old provisioning system, this may be considered "dead code". Commands generated by this portion of dead code do not need to be considered during the command generation of the new provisioning system, such as provisioning system 2. By examining the actual commands output and included in the log files, only those commands actually used are generated by a provisioning system are considered.

The foregoing techniques also verify the correctness of a command in a manner which does not check for actual syntax and positional dependency within a command, for example, as generated by the new provisioning system. Rather, a given command actually generated by an existing provisioning system, the various tables are checked to determine if the second provisioning system has the capability of generating the various words or phrases included in an actual command. This allows for the second or new provisioning system to generate commands in different orders or with a variety of syntax which are equivalent in terms of function to commands generated by the first or existing provisioning system. This eliminates one of the previously identified problems, for example, where a command generated by the first provisioning system may have different qualifiers or parameters in a different order, or where a series of commands produce equivalent function for a single command, for example, generated by the existing provisioning system. This is used as a technique for determining command or functional equivalence rather than performing a syntax or a string comparison, for example, to verify whether commands match between the two systems. The foregoing technique of allowing the variety of different switches and commands in different orders implies that this verification technique allows for verification of handling different dialects as generated by the second provisioning system. Commands may not be identical, but they may in effect produce the same correct results in generating commands. Generally, the foregoing techniques provide for quality verification of commands by an existing system by focusing on command equivalents in terms of functions, and equivalent vocabulary existing in tables of a new system.

When implementing a new provisioning system, such as provisioning system 2 of FIG. 1, it may be necessary to determine the various switch specific command options as generated by an existing provisioning system in order to populate those data bases and tables included in the second new provisioning system. In other words, it must be determined what switch identifier specific command options are currently generated and used by a first provisioning system in order to populate the data base and tables of the second new provisioning system to generate switch specific commands.

What will be described in paragraphs that follow is a technique for automatically extracting commands and command options from a first provisioning system to be included in the database of the second new provisioning system to allow for switch specific command and command option generation in an automated fashion. Generally, this technique which will be described determines an actual working set of switch commands and switch command options. Accordingly, it is determined what outputs correspond from the first provisioning system for a particular working set of command and command options as an input. In other words, rather than figure out all possible command and command options which may be generated by an existing provisioning system, a technique is used whereby only those command and command options actually in use by current telephone subscribers are considered. Thus, any dead code which may be included the first existing provisioning system which is no longer used to actively generate command and command options is not considered in the new provisioning system by generating a simulated set of telephone subscription service orders which correspond to this actual working set and in putting this into the existing provisioning system, a controlled set of output is obtained. This controlled set of output is correlated with corresponding order input and the various command and command options for each specific switch identifier and order are used to populate various data tables included in the second provisioning system 2, 22 of FIG. 1.

It should be noted that those techniques described herein may be applied by those of ordinary skill in the art to other types of systems and applications which generate commands and command options, such as electronic banking systems.

Figure 29:
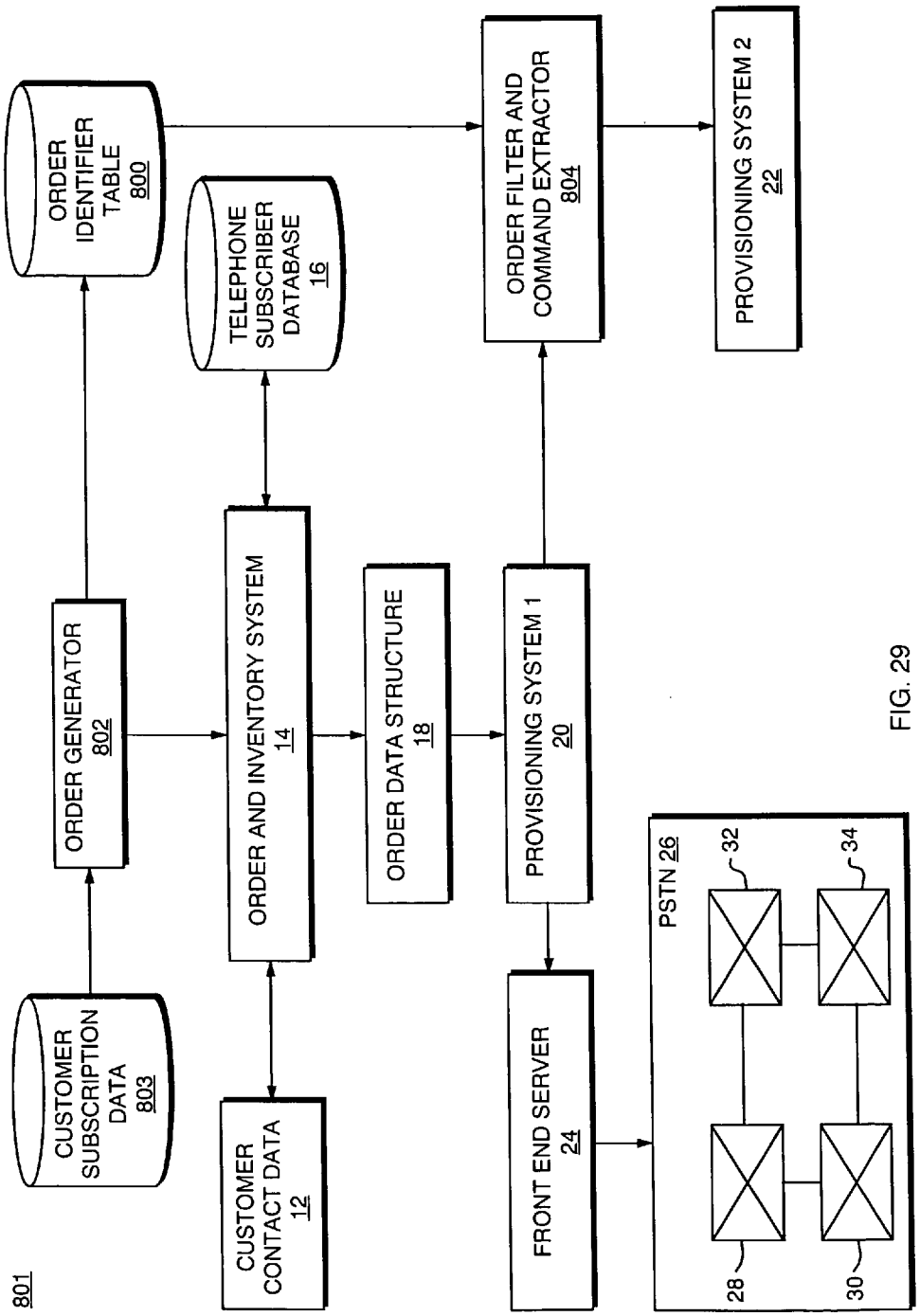
FIG. 29 is an example of an embodiment of block diagram of a system used to automatically generate switch specific command options based on a first existing provisioning system to be used in a second provisioning system.

Referring now to FIG. 29, shown is an example of the embodiment of a block diagram of a system used to automatically extract and generate switch specific command and command options which may be included in the second provisioning system to populate the data tables in accordance with various commands generated by an existing first provisioning system. System 801 includes components similar to that of system 10 of FIG. 1. In particular, customer contact data 12 is input to an order inventory system 14 which uses information from a telephone subscriber data base 16. The order inventory system 14 generates an order data structure corresponding to the subscriber order of the customer contact data 12. This order data structure is input to an existing first provisioning system 1, 20 which outputs various switch specific commands to the front end server 24. The front end server 24 sends the switch specific commands to a designated switch included in the PSTN 26. Each of these components are also included in the system 10 of FIG. 1.

Also included in the system 801 of FIG. 29 is an order generator 802. The order generator 802 generates a set of simulated orders which act as an input to the order and inventory system 14. Generally, the order generator 802 inputs a fixed format order similar to that which is input by the customer contact data 12 to the order and inventory system 14. Additionally, the order generator stores various pieces of order specific information into an order identifier table 800. This order identifier table stores information based on various service orders and input into the order inventory system 14 for which a corresponding switch specific command is generated by the first provisioning system 1, 20 sent to the front end server 24. The order filter and command extractor 804 takes as input the command generated by the provisioning system 1, 20. The order filter and command extractor 804 uses the switch specific command generated by a provisioning system and information stored in the order identifier table 800 to correlate, for a given input set, what switch specific output parameter command option or options are generated by the first provisioning system 1, 20. In turn, the order filter and command extractor 804 uses these various command options as generated by an existing provisioning system 1, 20 to populate data tables included in the data base of the second provisioning system 2, 22.

The technique used in the system of FIG. 29 is an alternative to determining the complete set of commands and switch specific command options as may be generated by the provisioning system 1, element 20, of FIG. 29. In other words, a working set of switch specific commands and command options is determined and automatically generated by the order generator program 802. Thus, this system tests or simulates various service orders generation for those which may actually be generated by the provisioning system 1 based on switches and telephone subscriber options in use. The order generator 802 generates a corresponding order as input into the order and inventory system 14.

The order generator 802 generates service orders for each switch identifier. In other words, for each switch identifier, every combination or features actually in use by at least one customer or telephone subscriber is generated. Thus, the set of generated or simulated output by the order generator 802 represents the working services currently in use for each particular switch identifier. It should be noted that the order generator may obtain the various features actually used by the customers from an existing data base or other list of customer and subscriber service information 803. It should be noted that other embodiments may determine the actual working set of subscription data using other techniques in accordance with each particular application and embodiment.

Figure 30:
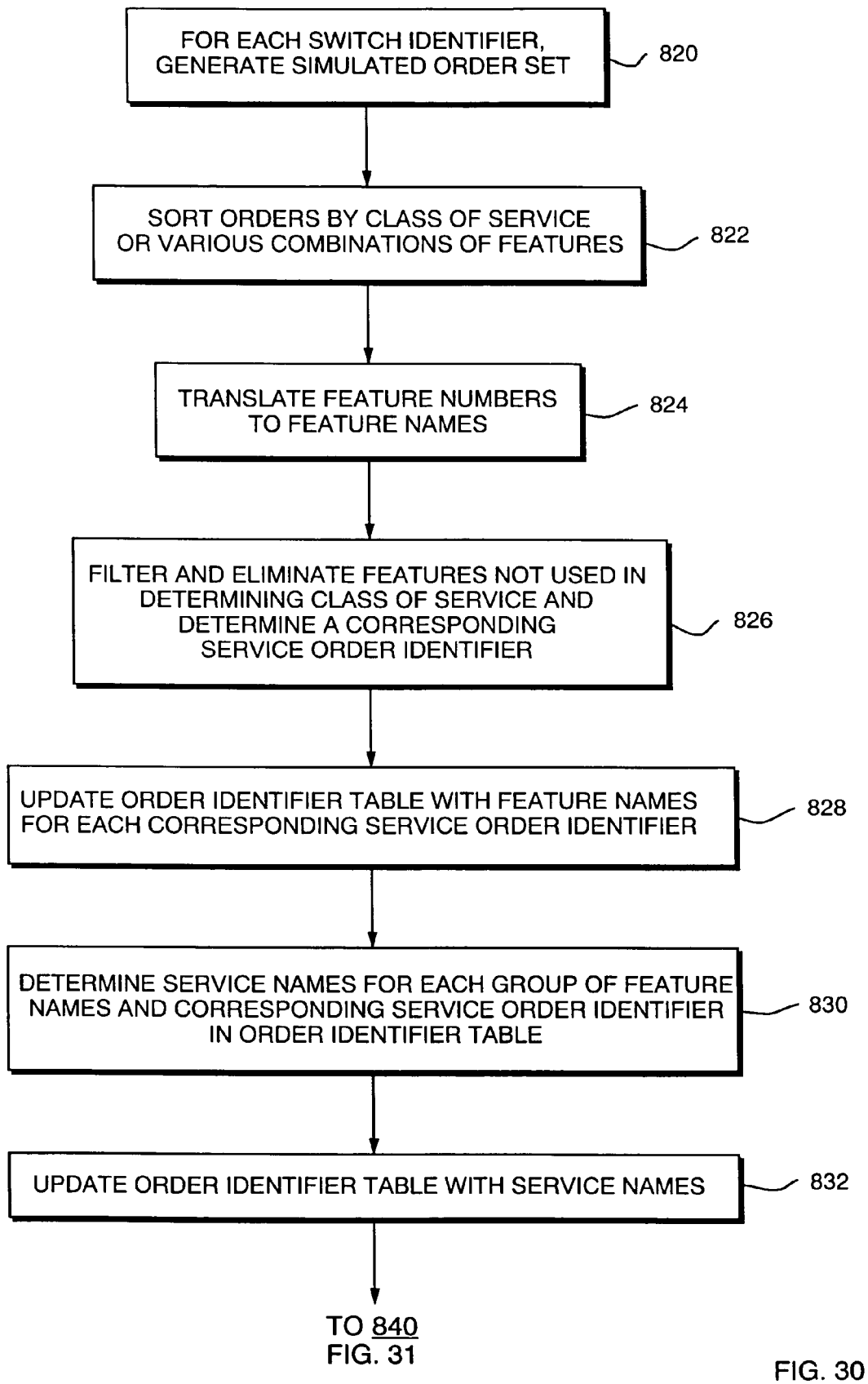
FIGS. 30 and 31 are flowcharts of a method of steps of an embodiment used to automatically determine various switch specific commands and command options from an existing provisioning system to be included in use in a new second provisioning system.
Figure 31:
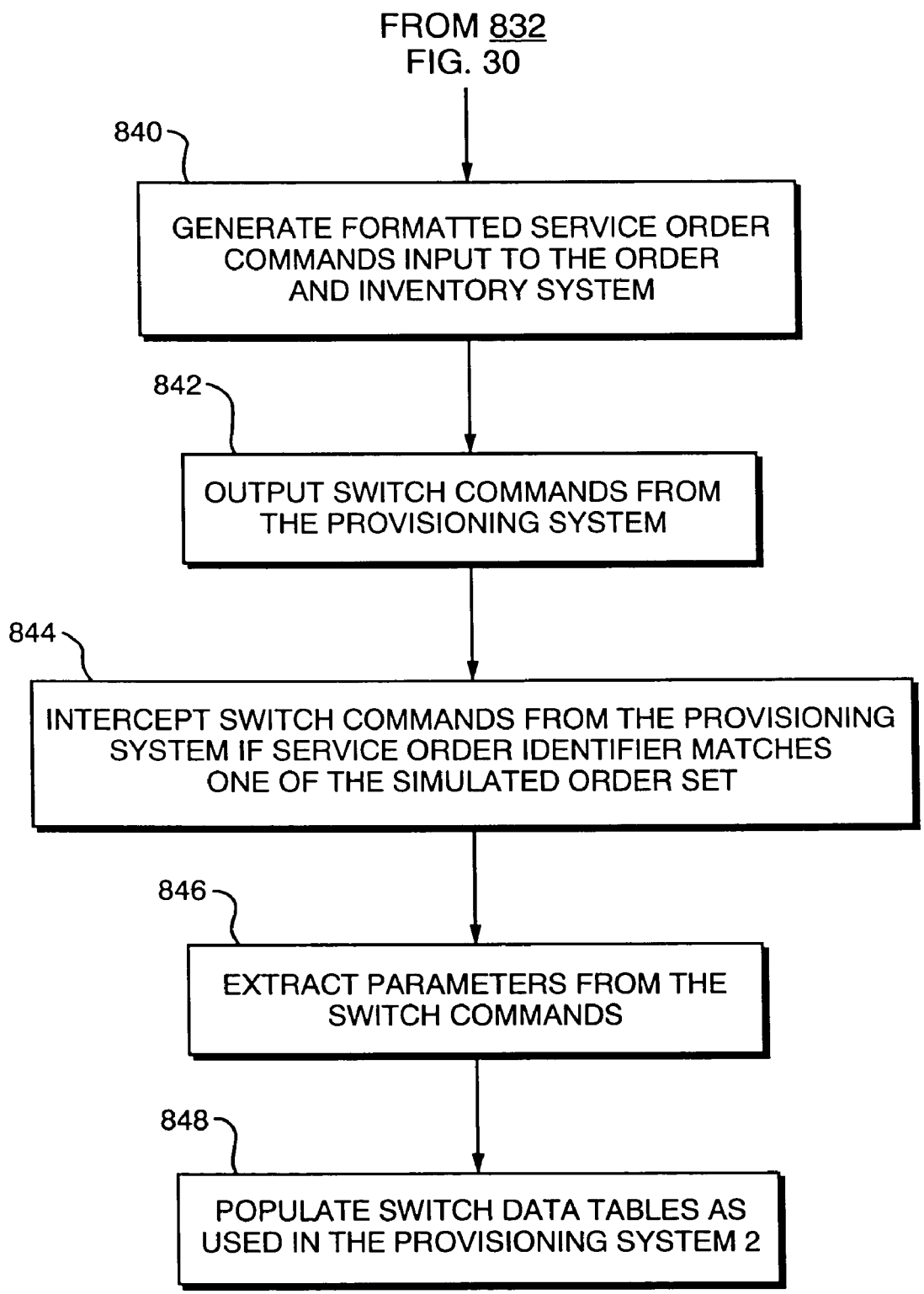

Referring now to FIGS. 30 and 31, shown are flowcharts of an example of an embodiment of the method steps for automatically extracting switch specific command options from a first provisioning system as used to populate databases and data tables included in the second provisioning system. At step 820, for each switch identifier, a simulated order set is generated. As previously described, a switch identifier identifies a specific switch as may be included in the PSTN 26 of FIG. 29 in the system 10 of FIG. 1. For each switch identifier, an order set is generated which corresponds to a working set of services for the various subscribers for that specific switch identifier. In this embodiment, in other words, every possible combination actually used by at least one customer subscriber for that particular switch identifier is determined. Accordingly, an order set of the various features and services actually in use for a particular switch identifier is determined.

Each of these orders generated as a result of step 820 may be in the format of a particular phone number as associated with a class of service which represents a combination of the various features in use or that may be used by a telephone subscriber. At step 822, the various orders are sorted by class of service or various combinations of features. In other words, at step 822, common classes of service or features are grouped together for each switch identifier. Generally, as a result, duplicate sets of features are identified and grouped together.

At step 824, feature numbers are translated to feature names. In other words, it is assumed that the data as included at step 822 includes numeric components which represent the various features or combinations of features available to the different telephone subscribers. At step 824, an alphabetic or alphanumeric equivalent for each of the numeric codes is determined as a result of step 824. The various tables as may be used to determine and translate the feature numbers to feature names are based on this particular instant and that customer contact dated 12 is typically first input into some kind of numeric field which is translated upon input to the ordered inventory system 14 to an alphabetic or alphanumeric equivalent. Thus, to simulate the same input from the order generator program and put to the order inventory system, an equivalent translation must be made by the order generator program 802. In this particular instance, the feature names actually generated by step 824 may be those actually included in the final fixed format record which is output by the order generator 802 and access input to the order and inventory system 14 representing the various subscription orders. It should be noted that in this embodiment, those feature names translated at step 824 are actually included in the feature name table as included in the second provisioning system.

At step 826, those features not used in determining the class of service are eliminated from the various subscription orders. In other words, as previously described, approximately 60 of over 400 features in this particular embodiment are used in determining class of service. Thus, any features included in a particular service order which are not actually used in determining a class of service, or not actually included in this subset of approximately 60 features, are filtered and eliminated as a result of step 826 from each of the generated service orders.

At step 828, the order identifier table 800 as included in FIG. 29 is updated with these feature names for each corresponding service order identifier. At step 826, a service order identifier is determined which corresponds to the various combination of features representing a particular class of service for this service order. At step 828, the order identifier table is updated with an order identifier and the corresponding feature names representing that service order for that combination of features. At step 830, the service name for each group of feature names stored in the order identifier table is determined. At step 832, the service names are also added to the order identifier table 800. Thus, as a result of the processing to step 832, the order identifier table is populated with an order identifier or surface order ID as previously described with a corresponding service name and the various combinations of corresponding features for that particular service name.

In this embodiment, the service name may be determined by using various tables and data structures as may be included in the second provisioning system 22. Recall that the feature name table 370 of FIG. 17 may be used in conjunction with the service names table 570 to determine the service name corresponding to a particular class of service or combination of approximately 60 features which have been subsetted. Recall that each feature name is represented in a vector representation by a corresponding position in a service identifier. In other words, the feature name table 370 as previously described for particular feature name has a position, such as a column within the service identifier. The feature name table 370 determines which position in the service identifier corresponds to a particular feature name. By examining at a combination of various features using the feature name table, a vector of values may be determined representing a combination of the various features for a particular subscription order. This forms a service identifier which may be used as an index into the previously described service names table using, as a key, the service name identifier 572. Accordingly, a service name may be determined which represents or corresponds to the various service name identifiers for a combination of features.

It should be noted that the tables used to determine the service names at step 830 may be those actually stored in the second provisioning system, or equivalent tables storing equivalent data in other locations. The actual location of the various tables used in steps 830 and 832 may be determined in accord to each particular embodiment.

Referring now to FIG. 31, control proceeds from step 832 to step 840 in which formatted service order commands are generated and input to the order and inventory system 14 of FIG. 29. In other words, the order generator program 802 updates the order identifier table with service name, order identifier, feature names and also outputs or generates formatted service order commands in accordance with a predefined format of the order and inventory system. It should be noted that in this particular embodiment, this is a fixed format order which is generated and expected by the order inventory system 14. Other embodiments may use different systems to implement the other inventory system, and thus the actual form of the order generated by the order generator 802 may vary with each particular embodiment and implementation.

At step 842, switch commands are generated by provisioning system 1, 20. At step 844, the switch commands as generated by provisioning system 20 are intercepted and examined to determine if the service order identifier matches one of the simulated order sets as generated by the order generator program 802. In this particular embodiment, referring back to FIG. 29, the order filter and command extractor 804 takes as input the commands generated by provisioning system 1, 20 and uses information stored in the order identifier table 800 to determine if the service order identifier for a given command generated by the provisioning system 1 corresponds to an entry in the order identifier table 800 as generated by the order generator 802. For each of these particular service orders matching one order identifier table 800, the order filter and command extractor extracts the parameters from the various switch commands at step 846. Using the information stored in the order identifier table 800, and the parameters and switch commands for each switch type as extracted from the commands generated by the provisioning system, the order filter and command extractor 804 populates switch specific data tables as included in use in the second provisioning system 22, as in step 848.

For example, referring back to FIG. 18, tables 400, 420, 435, 440, and 450 may be populated with switch specific command options. For example, referring to FIG. 18, the 5ESS switch table 400 may be populated. The switch identifier may be obtained from the command message generated by the provisioning system 1 to the front end server. Similarly, the service name and other parameters or records included in the 5ESS switch table for each record entering may be obtained from data included in the order identifier table 800, as each of the different fields included in a record will present the different features.

Referring now to FIG. 32, shown is an example of an embodiment of the order identifier table 800 as may be included in the system 801 of FIG. 29. The order identifier table 800 includes in this particular embodiment three fields for each record. A service order ID 102 has corresponding service name 810 and feature names 812. It should be noted that the service order ID 102 corresponds to the service order ID as included in the new data structure 100 of FIG. 6 previously described. The service order ID corresponds to various combinations of features for this particular service order. As determined by different data tables, the various combination of feature names corresponds to a given service name.

Also as previously described, the order generator program 802 creates the order identifier table 800. The order filter and command extractor 804 uses the order identifier table 800 and various switch specific commands and command options as generated by the provisioning system 20 to populate switch specific tables as may be included in the provisioning system 2.

It should also be noted that various fields included in the switch specific tables, such as the DMS 100 switch table and the GTD5 switch table 430, each may include text actually used in command generation. It is this information, along with the various feature specific information, which is populated into the different switch specific data tables in accordance with commands generated by the provisioning system 20 and information stored in the order identifier table 800. As an example, the GTD5 switch table 430, as previously described in conjunction with FIG. 18, includes data that may be included in a command. Thus, various fields of information as included in a record of the GTD5 switch table is actually text from a generated switch command from the provisioning system 20 stored in a record with the corresponding service name for the various servicing features as obtained from a corresponding order in the order identifier table 800.

It should be noted that the order generator 802 may be a single program or a combination of various programs executed on different machines or hardware processors. Generally, these one or more processors may be commercially available processors. The various functions as specified in this particular embodiment as performed by the order generator 802 may be implemented for use on one or more of a variety of commercially available processors using commercially available programming languages and scripting languages. For example, one embodiment, referring back to the steps of FIG. 30, sorts orders as a result of step 822 by using a scripting language included in a particular implementation of the order and inventory system 14. The steps of determining a service name for a particular combination of features as well as filtering and eliminating those features not used in determining the class of service or service name may be performed on one of the variety of commercially available processors such as an Intel-based processor. The filtering of those features, as performed at step 826, not included in the service name may be performed by a program written in the PERL programming language previously described. The determination of the service name in accordance with the various features may be written in a commercially available programming language, such as "C", also executing on a commercially available processor running the UNIX operating system. The programs written in PERL and "C", respectively, for filtering and identifying a service name may both be executed on a different processor from software performing the functions of the previous processing steps, such as 820, 822 and 824. In particular, if the data tables which are used include using a service name and feature names table, the processing steps associated with these functions may be performed on a different system having access to these data tables stored in the second provisioning system. Subsequent processing steps such as 840 may be performed on another system. The step of formatting service order commands with a particular fixed data format as step 840 may be performed by a commercially available Intel-based processor. The program which generates these fixed format service orders may be, for example, written in a commercially available language such as Basic executed on an Intel-based processor.

Thus, as known to those skilled in the art, various techniques, programming languages, and the like may be used to implement the various steps described in conjunction with the flowchart of FIGS. 30 and 31. Also in accordance with each particular embodiment, data may be stored in a variety of different configurations in accordance with system hardware and software configurations that perform the method steps of FIGS. 30 and 31. Accordingly, with each particular embodiment, different programming languages and different processors may be used in combination to generate and implement the output and the functions of the method steps of flowchart of FIGS. 30 and 31.

Generally, the techniques described herein for generating and populating various switch specific tables used in a second new provisioning system are in accordance with commands generated with an existing first provisioning system. Generally, the techniques do not focus on the coverage of commands and options that may be generated by the first or existing provisioning system, but rather focus on the actual set of command and options actually generated by the first provisioning system in accordance with a working set of subscription services and options actually in use by customers. This approach focuses on actual, rather than potential, switch command options. One advantage of the foregoing technique, for example, is that commands which may be outdated and no longer in use, and thus no longer generated by an existing system, are not included in the second newer provisioning system. This is similar to the concept previously described for testing. By first determining the actual set of subscription services and features in use by customers today, only those commands actually generated by the existing provisioning system are considered when populating data tables used in a second provisioning system.

While the invention has been disclosed in connection with preferred embodiments shown and described in detail, their modifications and improvements thereon will become readily apparent to those skilled in the art. Accordingly, the spirit and scope of the present invention is should be limited only by the following claims.

What is claimed is:

1. A method executed in a computer system of verifying generated commands, the method comprising:
   providing first switch commands generated by a first system;
   generating a subset of said first switch commands generated by said first system;
   providing data used by a second system to generate second switch commands;
   determining whether said data used by said second system corresponds to first switch commands included in said subset, wherein a correspondence between said data and said first switch commands is indicative of said second system being capable of generating at least one second switch command equivalent to a first switch command included in said subset;
   recording said subset of first switch commands in a log file, said first switch commands being associated with at least one switch type;
   sorting said subset of said first switch commands by switch type; and
   for a switch type in said log file, determining whether said data used by said second system corresponds to first switch commands associated with said switch type, wherein a correspondence between said data and said first switch commands is indicative of said second system being capable of generating at least one second switch command equivalent to first switch commands associated with said switch type.

2. A method executed in a computer system of verifying generated commands, the method comprising:
   providing first switch commands generated by a first system;
   generating a subset of said first switch commands generated by said first system;
   providing data used by a second system to generate second switch commands;
   determining whether said data used by said second system corresponds to first switch commands included in said subset, wherein a correspondence between said data and said first switch commands is indicative of said second system being capable of generating at least one second switch command equivalent to a first switch command included in said subset;
   determining a list of switch identifiers, said switch identifiers identifying switches included in a telecommunications network; and
   including at least one portion of said data used by said second system into at least one hash table, said at least one portion based on said list of switch identifiers.

3. The method of claim 2, wherein said subset of first switch commands includes successfully executed switch commands.

4. The method of claim 2, wherein said first system is a system for generating first switch commands for a telecommunications network and said second system is a system for generating second switch commands for said telecommunications network, said second switch commands being equivalent to said first switch commands.

5. The method of claim 2, wherein determining whether said data used by said second system corresponds to first switch commands included in said subset includes:
   for a first switch command included in said subset, using said at least one hash table to identify parameters associated with said first switch command;
   replacing identified parameters with at least one character representing identification in at least one hash table; and
   determining that said second system is capable of generating said first switch command by determining that said parameters associated with said first switch command have been identified in at least one hash table.

6. The method of claim 5, wherein said at least one character includes at least one of a null character, a comma, and a blank character.

7. The method of 5, further including:
generating a summary for a switch identifier, the summary including parameters of first switch commands that have not been identified in at least one hash table.

8. The method of claim 2, wherein said data used by said second system are stored in a database used by said second system, and wherein said data include at least one of command parameters and programs used to generate second switch commands.

9. A system for verifying generated commands that stored, and used by a processor, in a computer system, the system comprising:
means for providing first switch commands generated by a first system;
means for generating a subset of said first switch commands generated by said first system;
means for providing data used by a second system to generate second switch commands;
means for determining whether said data used by said second system corresponds to first switch commands included in said subset, wherein a correspondence between said data and said first switch commands is indicative of said second system being capable of generating at least one second switch command equivalent to a first switch command included in said subset;
means for recording said subset of first switch commands in a log file, said first switch commands being associated with at least one switch type;
means for sorting said subset of said first switch commands by switch type; and
for a switch type in said log file, means for determining whether said data used by said second system corresponds to first switch commands associated with said switch type, wherein a correspondence between said data and said first switch commands is indicative of said second system being capable of generating at least one second switch command equivalent to first switch commands associated with said switch type.

10. A system for verifying generated commands that stored, and used by a processor, in a computer system, the system comprising:
means for providing first switch commands generated by a first system;
means for generating a subset of said first switch commands generated by said first system;
means for providing data used by a second system to generate second switch commands;
means for determining whether said data used by said second system corresponds to first switch commands included in said subset, wherein a correspondence between said data and said first switch commands is indicative of said second system being capable of generating at least one second switch command equivalent to a first switch command included in said subset;
means for determining a list of switch identifiers, said switch identifiers identifying switches included in a telecommunications network; and
means for including at least one portion of said data used by said second system into at least one hash table, said at least one portion based on said list of switch identifiers.

11. The system of claim 10, wherein said subset of first switch commands includes successfully executed switch commands.

12. The system of claim 10, wherein said first system is a system for generating first switch commands for a telecommunications network and said second system is a system for generating second switch commands for said telecommunications network, said second switch commands being equivalent to said first switch commands.

13. The system of claim 10, wherein means for determining whether said data used by said second system corresponds to first switch commands included in said subset includes:
for a first switch command included in said subset, means for using said at least one hash table to identify parameters associated with said first switch command;
means for replacing identified parameters with at least one character representing identification in at least one hash table; and
means for determining that said second system is capable of generating said first switch command by determining that said parameters associated with said first switch command have been identified in at least one hash table.

14. The system of claim 13, wherein said at least one character includes at least one of a null character, a comma, and a blank character.

15. The system of claim 13, further including:
means for generating a summary for a switch identifier, the summary including parameters of first switch commands that have not been identified in at least one hash table.

16. The system of claim 10, wherein said data used by said second system are stored in a database used by said second system, and wherein said data include at least one of command parameters and programs used to generate second switch commands.

17. A system for verifying commands, the system comprising a machine-readable storage medium having machine-executable instructions stored therein, the machine-executable instructions comprise:
machine executable instructions for providing first switch commands generated by a first system;
machine executable instructions for generating a subset of said first switch commands generated by said first system;
machine executable instructions for providing data used by a second system to generate second switch commands;
machine executable instructions for determining whether said data used by said second system corresponds to first switch commands included in said subset, wherein a correspondence between said data and said first switch commands is indicative of said second system being capable of generating at least one second switch command equivalent to a first switch command included in said subset;
machine executable instructions for recording said subset of first switch commands in a log file, said first switch commands being associated with at least one switch type;
machine executable instructions for sorting said subset of said first switch commands by switch type; and
for a switch type in said log file, machine executable instructions for determining whether said data used by said second system corresponds to first switch commands associated with said switch type, wherein a correspondence between said data and said first switch commands is indicative of said second system being capable of generating at least one second switch command equivalent to first switch commands associated with said switch type.

18. A system for verifying commands, the system comprising a machine-readable storage medium having machine-executable instructions stored therein, the machine-executable instructions comprising:
   machine executable instructions for providing first switch commands generated by a first system;
   machine executable instructions for generating a subset of said first switch commands generated by said first system;
   machine executable instructions for providing data used by a second system to generate second switch commands;
   machine executable instructions for determining whether said data used by said second system corresponds to first switch commands included in said subset, wherein a correspondence between said data and said first switch commands is indicative of said second system being capable of generating at least one second switch command equivalent to a first switch command included in said subset;
   machine executable instructions for determining a list of switch identifiers, said switch identifiers identifying switches included in a telecommunications network; and
   machine executable instructions for including at least one portion of said data used by second system into at least one hash table, said at least one portion based on said list of switch identifiers.

19. The system of claim 18, wherein said subset of first switch commands includes successfully executed switch commands.

20. The system of claim 18, wherein said first system is a system for generating first switch commands for a telecommunications network and said second system is a system for generating second switch commands for said telecommunications network, said second switch commands being equivalent to said first switch commands.

21. The system of claim 18, wherein machine executable instructions for determining whether said data used by said second system corresponds to first switch commands included in said subset include:
   for a first switch command included in said subset, machine executable instructions for using said at least one hash table to identify parameters associated with said first switch command;
   machine executable instructions for replacing identified parameters with at least one character representing identification in at least one hash table; and
   machine executable instructions for determining that said second system is capable of generating said first switch command by determining that said parameters associated with said first switch command have been identified in at least one hash table.

22. The system of claim 21, wherein said at least one character includes at least one of a null character, a comma, and a blank character.

23. The system of claim 21, further including:
   machine executable instructions for generating a summary for a switch identifier, the summary including parameters of first switch commands that have not been identified in at least one hash table.

24. The system of claim 18, wherein said data used by said second system are stored in a database used by said second system, and wherein said data include at least one of command parameters and programs used to generate second switch commands.

25. A method of verifying switch commands for a telecommunications network, the method comprising:
   obtaining from a first system first executable switch commands for a telecommunications network;
   providing data used by a second system to generate second executable switch commands for the telecommunications network;
   comparing the first executable switch commands with the data used by the second system;
   based on a match between a first executable switch command and the data used by the second system, identifying the matched first executable switch command as being coded by data used by the second system to generate a second executable switch command for the telecommunications network;
   determining switch types included in the telecommunications network;
   recording at least one portion of the first executable switch commands in a log file, the at least one portion based on the switch types; and,
   generating a hash table including at least one portion of the data used by the second system, the at least one portion based on the switch types.

26. The method of claim 25, wherein identifying includes:
   based on a match between a first executable switch command in the log file and the data included in the hash table, replacing the matched first executable switch command in the log file with at least one character representing identification in the hash table.

27. The method of claim 26, wherein the at least one character includes at least one of a null character, a comma, and a blank character.

28. A system of verifying switch for a telecommunications network, the system comprising:
   means for obtaining from a first system first executable switch commands for a telecommunications network;
   means for providing data used by a second system to generate second executable switch commands for the telecommunications network;
   means for comparing the first executable switch commands with the data used by the second system;
   based on a match between a first executable switch command and the data used by the second system, means for identifying the matched first executable switch command as being coded by data used by the second system to generate a second executable switch command for the telecommunications network;
   means for determining switch types included in the telecommunications network;
   means for recording at least one portion of the first executable switch commands in a log file, the at least one portion based on the switch types; and,
   means for generating a hash table including at least one portion of the data used by the second system, the at least one portion based on the switch types.

29. The system of claim 28, wherein means for identifying includes:
   based on a match between a first executable switch command in the log file and the data included in the hash table, means for replacing the matched first executable switch command in the log file with at least one character representing identification in the hash table.

30. The system of claim 29, wherein the at least one character includes at least one of a null character, a comma, and a blank character.

31. A system of verifying switch commands for a telecommunications network, the system comprising a machine-readable storage medium having machine-executable instructions stored therein, the machine-executable instructions comprising:

machine executable instructions for obtaining from a first system first executable switch commands for a telecommunications network;

machine executable instructions for providing data used by a second system to generate second executable switch commands for the telecommunications network;

machine executable instructions for comparing the first executable switch commands with the data used by the second system;

based on a match between a first executable switch command and the data used by the second system, machine executable instructions for identifying the matched first executable switch command as being coded by data used by the second system to generate a second executable switch command for the telecommunications network;

machine executable instructions for determining switch types included in the telecommunications network;

machine executable instructions for recording at least one portion of the first executable switch commands in a log file, the at least one portion based on the switch types; and, machine executable instructions for generating a hash table including at least one portion of the data used by the second system, the at least one portion based on the switch types.

32. The system of claim 31, wherein machine executable instructions for identifying include:

based on a match between a first executable switch command in the log file and the data included in the hash table, machine executable instructions for replacing the matched first executable switch command in the log file with at least one character representing identification in the hash table.

33. The system of claim 32, wherein the at least one character includes at least one of a null character, a comma, and a blank character.

\* \* \* \* \*